(12) United States Patent
Sprenger et al.

(10) Patent No.: US 10,595,076 B2
(45) Date of Patent: *Mar. 17, 2020

(54) METHOD AND SYSTEM FOR IMPLEMENTING MEDIA STREAM SYNCHRONIZATION

(71) Applicant: CenturyLink Intellectual Property LLC, Broomfield, CO (US)

(72) Inventors: Michael D. Sprenger, Boulder, CO (US); Zubin Ingah, Centennial, CO (US)

(73) Assignee: CenturyLink Intellectual Property LLC, Broomfield, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/390,338

(22) Filed: Apr. 22, 2019

(65) Prior Publication Data

US 2019/0246166 A1    Aug. 8, 2019

Related U.S. Application Data

(63) Continuation of application No. 16/044,340, filed on Jul. 24, 2018, now Pat. No. 10,271,089, which is a continuation of application No. 15/785,185, filed on Oct. 16, 2017, now Pat. No. 10,051,312.

(60) Provisional application No. 62/520,249, filed on Jun. 15, 2017, provisional application No. 62/429,493, filed on Dec. 2, 2016.

(51) Int. Cl.
*H04N 5/04* (2006.01)
*H04N 9/475* (2006.01)
*H04N 21/43* (2011.01)
*H04N 21/44* (2011.01)
*H04N 21/442* (2011.01)

(52) U.S. Cl.
CPC ... *H04N 21/4305* (2013.01); *H04N 21/44004* (2013.01); *H04N 21/44008* (2013.01); *H04N 21/4424* (2013.01)

(58) Field of Classification Search
CPC ......... H04N 21/4305; H04N 21/44004; H04N 21/44008; H04N 21/4424; H04N 5/0736; H04N 5/073; H04N 5/04; H04N 9/475
USPC ................. 348/500, 513, 512, 518; 725/110; 375/354, 356
See application file for complete search history.

(56) References Cited

U.S. PATENT DOCUMENTS 6,897,903 B1   5/2005 Hu
10,051,312 B2  8/2018 Sprenger et al.
2015/0304526 A1  10/2015 Maurice
(Continued)

*Primary Examiner* — Sherrie Hsia

(57) ABSTRACT

Novel tools and techniques are provided for implementing media content streaming or playback, and, more particularly, for implementing media stream synchronization. In some embodiments, a synchronization system might receive a first signal that is output from a first device, which receives an original video signal from a video source and outputs a first video signal. The synchronization system might analyze the first signal to determine a first frame buffer delay, generate a delay adjustment signal based on such determination, and send the delay adjustment signal to a frame buffer delay device. The frame buffer delay device and the first device might concurrently receive the original video signal from the video source. The first delay adjustment signal causes the frame buffer delay device to apply the first frame buffer delay to the original video signal to produce a second video signal that is synchronized with the first video signal.

20 Claims, 17 Drawing Sheets

(56) References Cited

U.S. PATENT DOCUMENTS

2018/0160151 A1 6/2018 Sprenger et al.
2018/0160166 A1 6/2018 Sprenger et al.
2018/0332334 A1 11/2018 Sprenger et al.

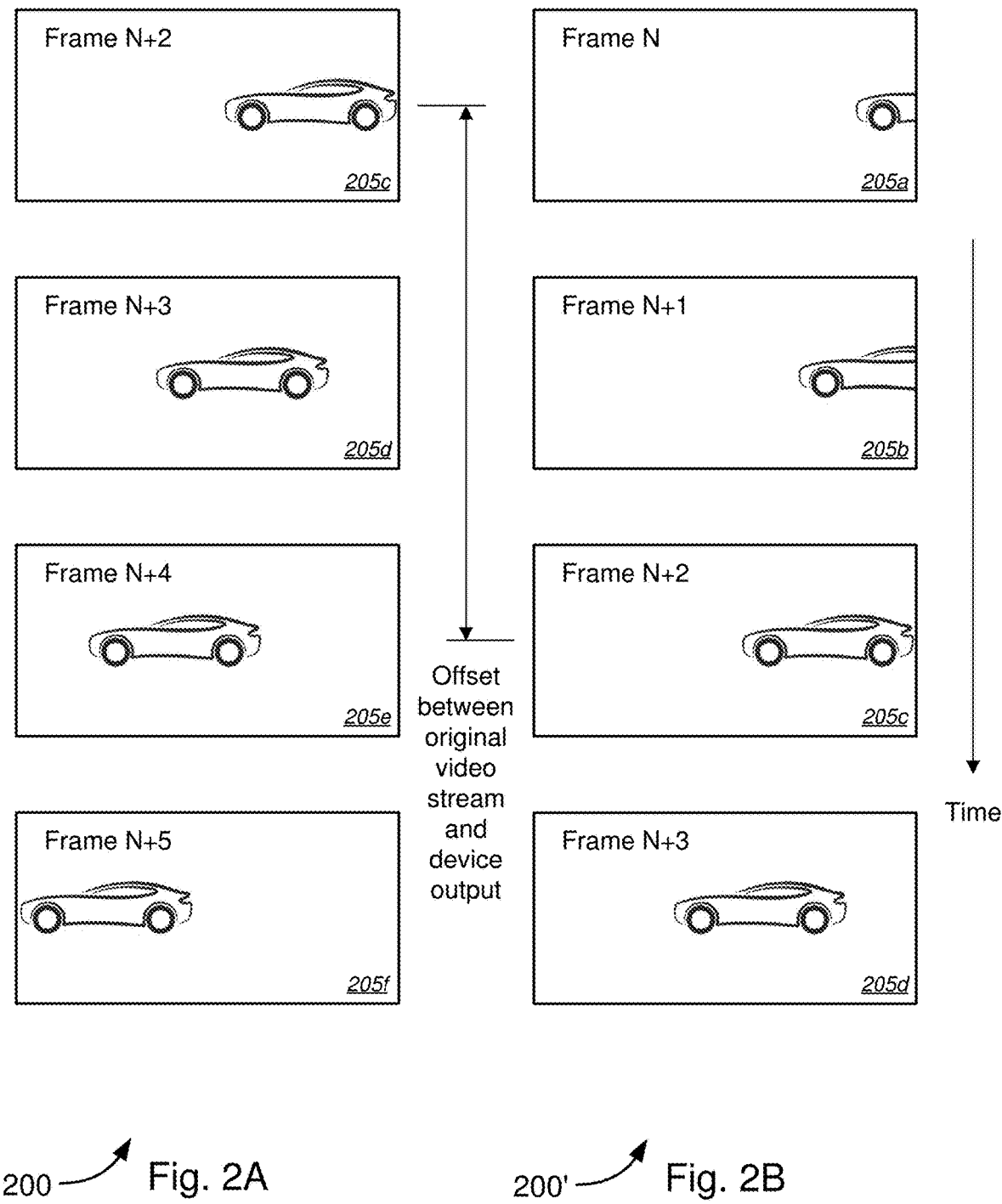

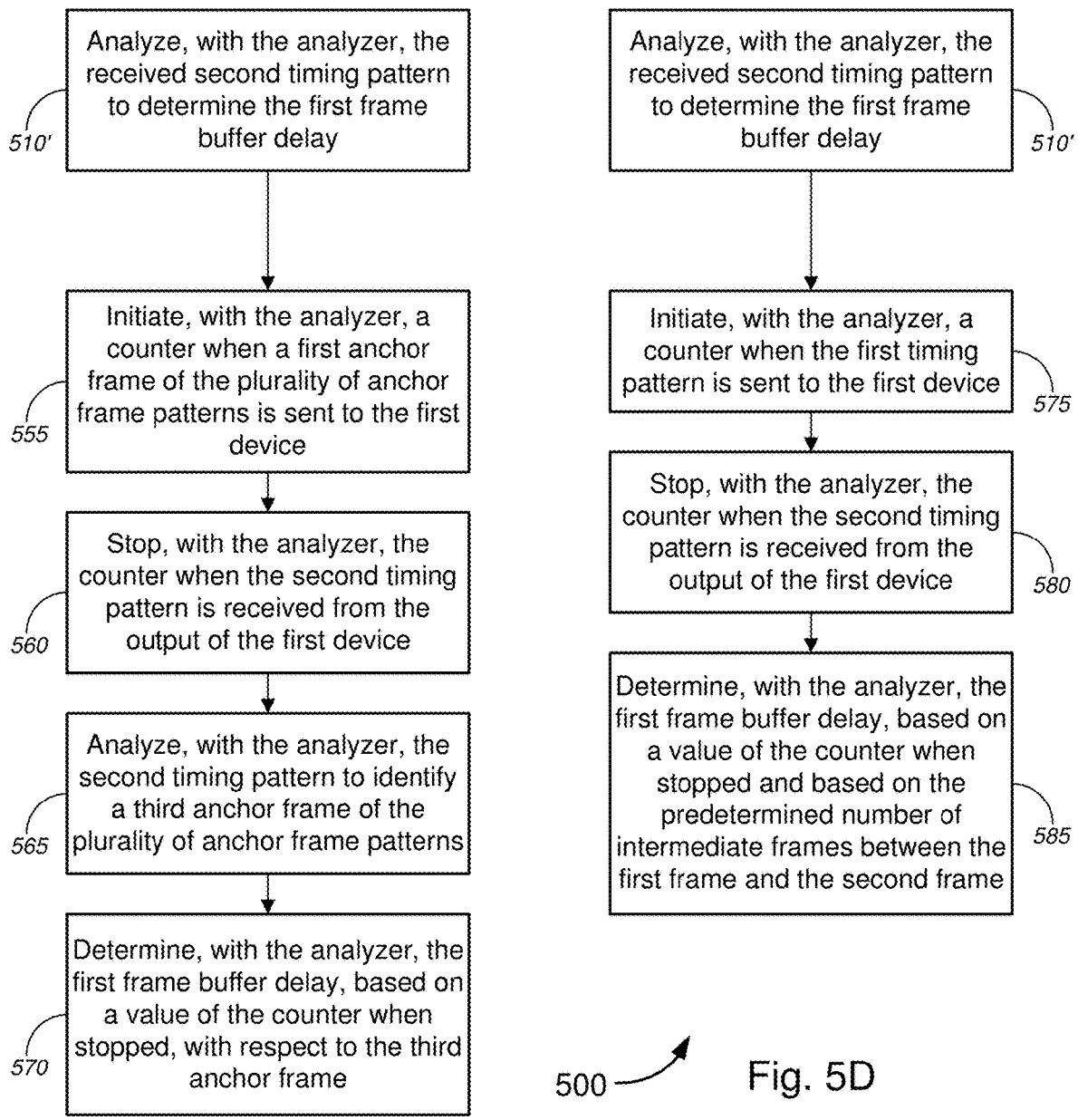

METHOD AND SYSTEM FOR IMPLEMENTING MEDIA STREAM SYNCHRONIZATION

CROSS-REFERENCES TO RELATED APPLICATIONS

This application is a continuation application of U.S. patent application Ser. No. 16/044,340 (the "'340 application"), filed Jul. 24, 2018 by Michael D. Sprenger et al., entitled, "Method and System for Implementing Media Stream Synchronization," which is a continuation application of U.S. patent application Ser. No. 15/785,185 (the "'185 application") (now U.S. Pat. No. 10,051,312), filed Oct. 16, 2017 by Michael D. Sprenger et al., entitled, "Method and System for Implementing Media Stream Synchronization," which claims priority to U.S. Patent Application Ser. No. 62/520,249 (the "'249 application"), filed Jun. 15, 2017 by Michael D. Sprenger et al., entitled, "Novel Method for Media Stream Synchronization," and U.S. Patent Application Ser. No. 62/429,493 (the "'493 application"), filed Dec. 2, 2016 by Michael D. Sprenger et al., entitled, "Detection and Visual Enhancement of Video Encoding Artifacts," the disclosure of each of which is incorporated herein by reference in its entirety for all purposes.

This application may be related to: U.S. patent application Ser. No. 15/477,812 (the "'812 application"), filed Apr. 3, 2017 by Michael D. Sprenger et al., entitled, "Method and System for Implementing Advanced Audio Shifting," which claims priority to U.S. Patent Application Ser. No. 62/435,992 (the "'992 application"), filed Dec. 19, 2016 by Michael D. Sprenger et al., entitled, "Advanced Audio Fading Mechanism"; U.S. patent application Ser. No. 15/785,145 (the "'145 application"), filed Oct. 16, 2017 by Michael D. Sprenger et al., entitled, "Method and System for Implementing Detection and Visual Enhancement of Video Encoding Artifacts," which claims priority to U.S. Patent Application Ser. No. 62/429,493 (the "'493 application"), filed Dec. 2, 2016 by Michael D. Sprenger et al., entitled, "Detection and Visual Enhancement of Video Encoding Artifacts"; U.S. patent application Ser. No. 15/785,014 (the "'014 application"), filed Oct. 16, 2017 by Michael D. Sprenger et al., entitled, "Method and System for Implementing Automatic Audio Optimization for Streaming Services," which claims priority to U.S. Patent Application Ser. No. 62/410,269 (the "'269 application"), filed Oct. 19, 2016 by Michael D. Sprenger et al., entitled, "Automatic Audio Optimization for Streaming Services"; U.S. patent application Ser. No. 15/477,376 (the "'376 application"), filed Apr. 3, 2017 by Zubin Ingah et al., entitled, "Method and System for Implementing Content Navigation or Selection Using Touch-based Input," which claims priority to U.S. Patent Application Ser. No. 62/403,843 (the "'843 application"), filed Oct. 4, 2016 by Zubin Ingah et al., entitled, "Novel Mechanism for Content Selection Using Touchscreen or Touchpad"; U.S. patent application Ser. No. 15/477,356 (the "'356 application"), filed Apr. 3, 2017 by Michael D. Sprenger et al., entitled, "Video Quality Optimization Based on Display Capabilities," which claims priority to U.S. Patent Application Ser. No. 62/395,507 (the "'507 application"), filed Sep. 16, 2016 by Michael D. Sprenger et al., entitled, "Video Quality Optimization Based on Display Capabilities."

The respective disclosures of these applications/patents (which this document refers to collectively as the "Related Applications") are incorporated herein by reference in their entirety for all purposes.

COPYRIGHT STATEMENT

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

FIELD

The present disclosure relates, in general, to methods, systems, and apparatuses for implementing media content streaming or playback, and, more particularly, to methods, systems, and apparatuses for implementing media stream synchronization.

BACKGROUND

For purposes of assessing the visual quality of a video signal that has passed through, e.g., a transmission system, a transcoder, or equivalent system—potentially impairing its quality—, it is desirable to compare the original signal with the processed signal. The processing imposes a certain amount of latency onto the signal, so a direct side-by-side comparison is not possible, unless the original signal is also delayed by the same amount. Conventional techniques, however, do not do so.

Hence, there is a need for more robust and scalable solutions for implementing media content streaming or playback, and, more particularly, to methods, systems, and apparatuses for implementing media stream synchronization.

BRIEF DESCRIPTION OF THE DRAWINGS

A further understanding of the nature and advantages of particular embodiments may be realized by reference to the remaining portions of the specification and the drawings, in which like reference numerals are used to refer to similar components. In some instances, a sub-label is associated with a reference numeral to denote one of multiple similar components. When reference is made to a reference numeral without specification to an existing sub-label, it is intended to refer to all such multiple similar components.

FIGS. 2A and 2B are schematic diagrams illustrating an original video stream (FIG. 2A) and video stream as delayed after passing through a device under test ("DUT") (FIG. 2B), in accordance with various embodiments.

FIGS. 5A-5F are flow diagrams illustrating a method for implementing media stream synchronization, in accordance with various embodiments.

DETAILED DESCRIPTION OF CERTAIN EMBODIMENTS

Overview

Figure 1:
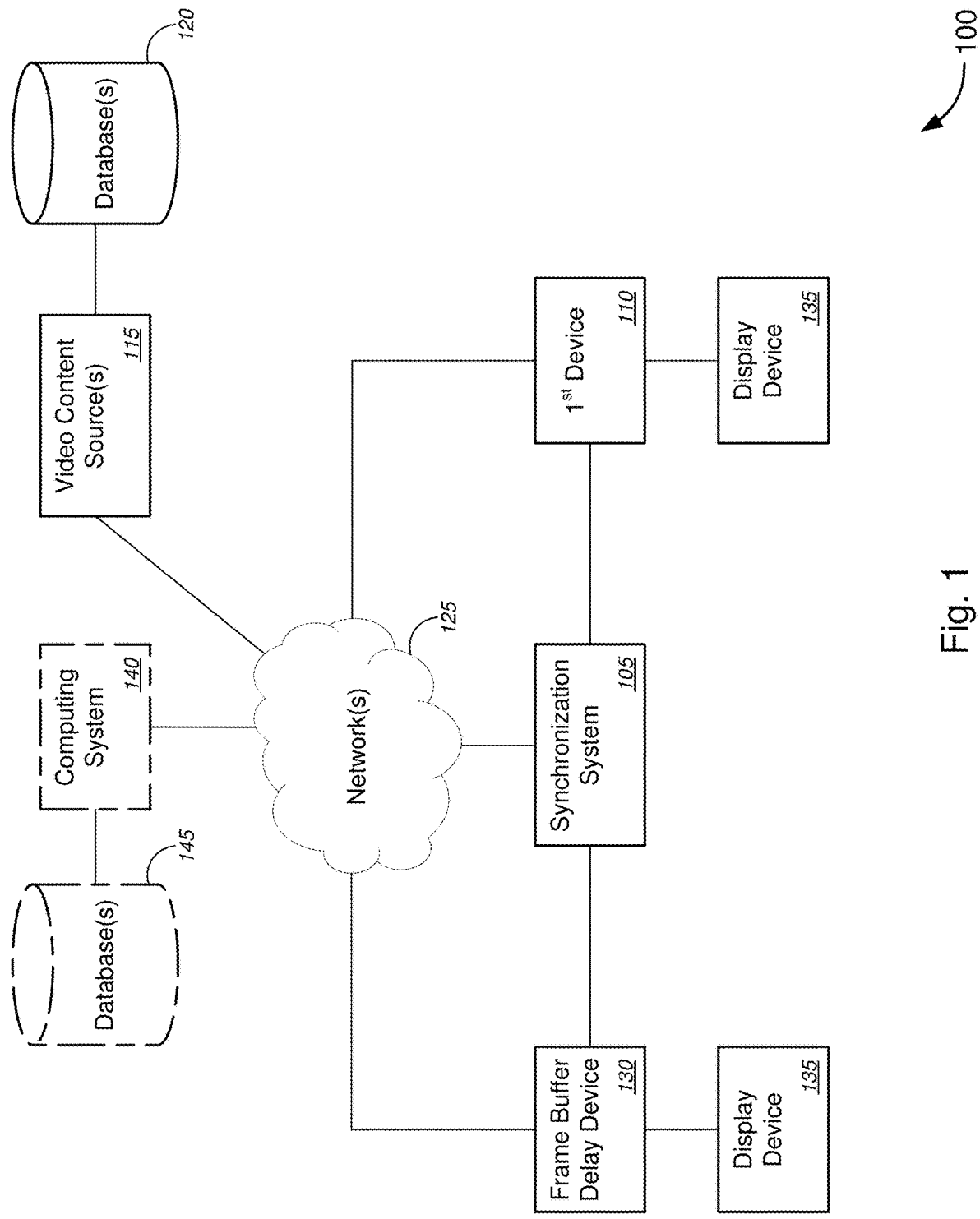
FIG. 1 is a schematic diagram illustrating a system for implementing media stream synchronization, in accordance with various embodiments.

Various embodiments provide tools and techniques for implementing media content streaming or playback, and, more particularly, to methods, systems, and apparatuses for implementing media stream synchronization.

In various embodiments, a synchronization system might receive a first signal that is output from a first device, wherein the first device receives an original video signal from a video source (e.g., a video content source(s) and/or database(s), or the like) and outputs a first video signal. The synchronization system might analyze the received first signal to determine a first frame buffer delay, and might generate a first delay adjustment signal based on the determined first frame buffer delay. The synchronization system might send the first delay adjustment signal to a frame buffer delay device. The frame buffer delay device, which is separate from the first device, might receive the original video signal from the video source concurrent with the first device receiving an original video signal from the video source. The first delay adjustment signal would cause the frame buffer delay device to apply the first frame buffer delay to the received original video signal to produce a second video signal that is synchronized with the first video signal. In some cases, the second video signal might be synchronized with the first video signal to within a predetermined threshold amount (which might be in terms of number of frames or number of seconds (or milliseconds), or the like).

In some embodiments, the synchronization system or engine might comprise a timing pattern generator and an analyzer. In such embodiments, the first signal would comprise a timing pattern. In alternative embodiments, the synchronization system or engine might comprise a frame comparator. In these embodiments, the first signal would comprise the first video signal.

Merely by way of example, in some instances, a comparator or computing system might control the operation of the synchronization system or engine, the first device, and/or the frame buffer delay device. Alternatively, or additionally, a comparator or computing system might perform additional processing of the video signals that are output by the first device and/or the frame buffer delay device. In some cases, the computing system, which might be either remote relative to the synchronization system or engine or local to the synchronization system or engine, might perform frame-by-frame comparisons to detect video quality impairments (including, but not limited to, video encoding artifacts, noise, dropouts, etc.), and in some cases to further perform visual enhancement of video encoding artifacts or the like, as described in greater detail in the '145 application, which claims priority to '493 application (and which has already been incorporated herein by reference in its entirety for all purposes). Alternatively, or additionally, display device(s) might display the first video signal that is output by the first device and/or might display the second video signal that is output by the frame buffer delay device, which either allows a user to view the two video signals and to manually adjust the frame delay.

The following detailed description illustrates a few exemplary embodiments in further detail to enable one of skill in the art to practice such embodiments. The described examples are provided for illustrative purposes and are not intended to limit the scope of the invention.

In the following description, for the purposes of explanation, numerous specific details are set forth in order to provide a thorough understanding of the described embodiments. It will be apparent to one skilled in the art, however, that other embodiments of the present invention may be practiced without some of these specific details. In other instances, certain structures and devices are shown in block diagram form. Several embodiments are described herein, and while various features are ascribed to different embodiments, it should be appreciated that the features described with respect to one embodiment may be incorporated with other embodiments as well. By the same token, however, no single feature or features of any described embodiment should be considered essential to every embodiment of the invention, as other embodiments of the invention may omit such features.

Unless otherwise indicated, all numbers used herein to express quantities, dimensions, and so forth used should be understood as being modified in all instances by the term "about." In this application, the use of the singular includes the plural unless specifically stated otherwise, and use of the terms "and" and "or" means "and/or" unless otherwise indicated. Moreover, the use of the term "including," as well as other forms, such as "includes" and "included," should be considered non-exclusive. Also, terms such as "element" or "component" encompass both elements and components comprising one unit and elements and components that comprise more than one unit, unless specifically stated otherwise.

Various embodiments described herein, while embodying (in some cases) software products, computer-performed methods, and/or computer systems, represent tangible, concrete improvements to existing technological areas, including, without limitation, media content streaming or downloading technology, media stream comparison technology, and/or the like. In other aspects, certain embodiments, can improve the functioning of user equipment or systems themselves (e.g., media players, set-top boxes ("STBs"), media content streaming or downloading systems, etc.), for example, by receiving, with a synchronization system, a first signal that is output from a first device, wherein the first device receives an original video signal from a video source and outputs a first video signal; analyzing, with the synchronization system, the received first signal to determine a first frame buffer delay; generating, with the synchronization system, a first delay adjustment signal based on the determined first frame buffer delay; and sending, with the synchronization system, the first delay adjustment signal to a frame buffer delay device, the frame buffer delay device, which is separate from the first device, receiving the original video signal from the video source concurrent with the first device receiving the original video signal from the video source, the first delay adjustment signal causing the frame buffer delay device to apply the first frame buffer delay to the received original video signal to produce a second video signal that is synchronized with the first video signal, and/or the like. In particular, to the extent any abstract concepts are present in the various embodiments, those concepts can be implemented as described herein by devices, software, systems, and methods that involve specific novel functionality (e.g., steps or operations), such as, receiving, with a synchronization system, a first signal that is output from a first device, wherein the first device receives an original video signal from a video source and outputs a first video signal; analyzing, with the synchronization system, the received first signal to determine a first frame buffer delay; generating, with the synchronization system, a first delay adjustment signal based on the determined first frame buffer delay; and sending, with the synchronization system, the first delay adjustment signal to a frame buffer delay device, the frame buffer delay device, which is separate from the first device, receiving the original video signal from the video source concurrent with the first device receiving the original video signal from the video source, the first delay adjustment signal causing the frame buffer delay device to apply the first frame buffer delay to the received original video signal to produce a second video signal that is synchronized with the first video signal, and/or the like, to name a few examples, that extend beyond mere conventional computer processing operations. These functionalities can produce tangible results outside of the implementing computer system, including, merely by way of example, implementing media stream synchronization to improve, e.g., optimized presentation of media content (including video content) thus providing for smoother and more efficient presentation of video content to the user, and/or the like, at least some of which may be observed or measured by customers and/or service providers.

In an aspect, a method might comprise receiving, with a synchronization system, a first signal that is output from a first device, wherein the first device receives an original video signal from a video source and outputs a first video signal; analyzing, with the synchronization system, the received first signal to determine a first frame buffer delay; generating, with the synchronization system, a first delay adjustment signal based on the determined first frame buffer delay; and sending, with the synchronization system, the first delay adjustment signal to a frame buffer delay device. The frame buffer delay device, which is separate from the first device, might receive the original video signal from the video source concurrent with the first device receiving the original video signal from the video source. The first delay adjustment signal might cause the frame buffer delay device to apply the first frame buffer delay to the received original video signal to produce a second video signal that is synchronized with the first video signal.

In some embodiments, the synchronization system might comprise a timing pattern generator and an analyzer. The first signal might comprise a second timing pattern, and the method might further comprise: switching, using a switch, input to the first device from the video source to the timing pattern generator; generating, with the timing pattern generator, a first timing pattern; and sending, with the timing pattern generator, the first timing pattern to the first device via the switch. In some cases, receiving, with the synchronization system, the first signal that is output from the first device might comprise receiving, with the analyzer, the second timing pattern that is output from the first device. In some instances, analyzing, with the synchronization system, the received first signal to determine the first frame buffer delay might comprise analyzing, with the analyzer, the second timing pattern to determine the first frame buffer delay. According to some embodiments, generating, with the synchronization system, the first delay adjustment signal based on the determined first frame buffer delay might comprise generating, with the analyzer, the first delay adjustment signal based on the determined first frame buffer delay. The method might further comprise switching, using the switch, input from the timing pattern generator to the video source, and sending, with the synchronization system, the first delay adjustment signal to the frame buffer delay device might comprise sending, with the analyzer, the first delay adjustment signal to the frame buffer delay device.

According to some embodiments, the first timing pattern might comprise a first anchor frame pattern of a plurality of anchor frame patterns, each of the plurality of anchor frame patterns being different from each other of the plurality of anchor frame patterns. The first anchor frame pattern of the plurality of anchor frame patterns might be encoded on a first frame of the original video signal and a second anchor frame pattern of the plurality of anchor frame patterns might be encoded on a second frame of the original video signal. The first frame and the second frame are separated by a predetermined number of frames of the original video signal, with intermediate frame patterns being encoded on intermediate frames of the original video signal between the first frame and the second frame. Each intermediate frame pattern might be the same as the first anchor frame pattern, and analyzing the second timing pattern to determine the first frame buffer delay might comprise: initiating, with the analyzer, a counter when a first anchor frame of the plurality of anchor frame patterns is sent to the first device; stopping, with the analyzer, the counter when the second timing pattern is received from the output of the first device; analyzing, with the analyzer, the second timing pattern to identify a third anchor frame of the plurality of anchor frame patterns; and determining, with the analyzer, the first frame buffer delay, based on a value of the counter when stopped, with respect to the third anchor frame.

In some instances, sending the first anchor frame to the first device might comprise encoding the first anchor frame on a frame of the original video signal. In some cases, the counter might comprise a clock. In some embodiments, each of the first anchor frame and the second anchor frame might comprise timing information.

Merely by way of example, according to some embodiments, the first timing pattern and the second timing pattern are the same pattern. The first timing pattern and the second timing pattern are encoded on a first frame and a second frame, respectively, of the original video signal. No timing patterns are encoded on each intermediate frame of a plurality of intermediate frames between the first frame and the second frame. The plurality of intermediate frames between the first frame and the second frame might comprise predetermined number of intermediate frames, and analyzing the second timing pattern to determine the first frame buffer delay comprise: initiating, with the analyzer, a counter when the first timing pattern is sent to the first device; stopping, with the analyzer, the counter when the second timing pattern is received from the output of the first device; and determining, with the analyzer, the first frame buffer delay, based on a value of the counter when stopped and based on the predetermined number of intermediate frames between the first frame and the second frame.

In some embodiments, sending the first timing pattern to the first device via the switch might comprise encoding, with the timing pattern generator, the first timing pattern on the first frame of the original video signal. In some cases, the counter might comprise a clock. In some instances, the timing pattern generator and the analyzer might be part of an integrated timing pattern generator-analyzer system.

According to some embodiments, the synchronization system might comprise a frame comparator, and the method might further comprise receiving, with the frame comparator, the second video signal that is produced by the frame buffer delay device. In some cases, receiving, with the synchronization system, the first signal that is output from the first device might comprise receiving, with the frame comparator, the first video signal that is output from the first device. In some instances, analyzing, with the synchronization system, the received first signal to determine the first frame buffer delay might comprise analyzing, with the frame comparator, the received first video signal and the received second video signal to determine a second frame buffer delay. In some cases, generating, with the synchronization system, the first delay adjustment signal based on the determined first frame buffer delay might comprise generating, with the frame comparator, a second delay adjustment signal based on the determined second frame buffer delay. In some instances, sending, with the synchronization system, the first delay adjustment signal to the frame buffer delay device might comprise sending, with the frame comparator, the second delay adjustment signal to the frame buffer delay device to produce the second video signal. The method might further comprise determining, with the frame comparator, whether the first video signal and the second video signal match to within a predetermined minimal difference. Based on a determination that a difference between the received first video signal and the received second video signal might exceed the predetermined minimal difference, repeating the processes of: generating, with the frame comparator, the second delay adjustment signal based on the second frame buffer delay; sending, with the frame comparator, the second delay adjustment signal to the frame buffer delay device, the second delay adjustment signal causing the frame buffer delay device to apply the second frame buffer delay to the received original video signal to produce the second video signal; receiving, with the frame comparator, the first video signal; receiving, with the frame comparator, the second video signal; analyzing, with the frame comparator, the received first video signal and the received second video signal; and determining, with the frame comparator, whether the received first video signal and the received second video signal match to within the predetermined minimal difference.

Merely by way of example, in some cases, determining whether the first video signal and the second video signal match to within the predetermined minimal difference might comprise computing, with the frame comparator, a difference signal between the first video signal and the second video signal; and analyzing, with the frame comparator, the difference signal with respect to the predetermined minimal difference. In some instances, determining whether the first video signal and the second video signal match to within the predetermined minimal difference might comprise utilizing one of peak signal-to-noise ratio ("PSNR") technique or root mean square ("RMS") technique, and/or the like. In some cases, the second video signal might be synchronized with the first video signal to within a predetermined threshold amount. In some embodiments, the method might comprise comparing, with a computing system, the first video signal and the second video signal in real-time, on a frame-by-frame basis. In some instances, the first device might comprise one of a video encoder, a video decoder, a video encoder/decoder system, a video transcoder, a video storage and replay system, a video transport system, or a video broadcast system, and/or the like.

In another aspect, a synchronization system might comprise at least one processor and a non-transitory computer readable medium communicatively coupled to the at least one processor. The non-transitory computer readable medium might have stored thereon computer software comprising a set of instructions that, when executed by the at least one processor, causes the synchronization system to: receive a first signal that is output from a first device, wherein the first device receives an original video signal from a video source and outputs a first video signal; analyze the received first signal to determine a first frame buffer delay; generate a first delay adjustment signal based on the determined first frame buffer delay; and send the first delay adjustment signal to a frame buffer delay device, the frame buffer delay device, which is separate from the first device, receiving the original video signal from the video source concurrent with the first device receiving the original video signal from the video source. The first delay adjustment signal might cause the frame buffer delay device to apply the first frame buffer delay to the received original video signal to produce a second video signal that is synchronized with the first video signal.

According to some embodiments, the synchronization system might further comprise a timing pattern generator, an analyzer, and a switch. The first signal might comprise a second timing pattern, wherein the set of instructions, when executed by the at least one processor, further causes the synchronization system to: switch, using the switch, input to the first device from the video source to the timing pattern generator; generate, with the timing pattern generator, a first timing pattern; and send the first timing pattern to the first device via the switch. In some instances, receiving the first signal that is output from the first device might comprise receiving, with the analyzer, the second timing pattern that is output from the first device. In some cases, analyzing the received first signal to determine the first frame buffer delay might comprise analyzing, with the analyzer, the second timing pattern to determine the first frame buffer delay. In some embodiments, generating the first delay adjustment signal based on the determined first frame buffer delay might comprise generating, with the analyzer, the first delay adjustment signal based on the determined first frame buffer delay. The set of instructions, when executed by the at least one processor, further causes the synchronization system to: switch, using the switch, input from the timing pattern generator to the video source. Sending the first delay adjustment signal to the frame buffer delay device might comprise sending, with the analyzer, the first delay adjustment signal to the frame buffer delay device.

In some embodiments, the synchronization system might further comprise a frame comparator, wherein the set of instructions, when executed by the at least one processor, might further cause the synchronization system to: receive, with the frame comparator, the second video signal that is produced by the frame buffer delay device. In some instances, receiving the first signal that is output from the first device might comprise receiving, with the frame comparator, the first video signal that is output from the first device. In some cases, analyzing the received first signal to determine the first frame buffer delay might comprise analyzing, with the frame comparator, the received first video signal and the received second video signal to determine a second frame buffer delay. In some instances, generating the first delay adjustment signal based on the determined first frame buffer delay might comprise generating, with the frame comparator, a second delay adjustment signal based on the determined second frame buffer delay. In some cases, sending the first delay adjustment signal to the frame buffer delay device might comprise sending, with the frame comparator, the second delay adjustment signal to the frame buffer delay device to produce the second video signal. The set of instructions, when executed by the at least one processor, might further cause the synchronization system to: determine, with the frame comparator, whether the first video signal and the second video signal match to within a predetermined minimal difference; and, based on a determination that a difference between the received first video signal and the received second video signal exceeds the predetermined minimal difference, causing the synchronization system to repeat: generating, with the frame comparator, the second delay adjustment signal based on the second frame buffer delay; sending, with the frame comparator, the second delay adjustment signal to the frame buffer delay device, the second delay adjustment signal causing the frame buffer delay device to apply the second frame buffer delay to the received original video signal to produce the second video signal; receiving, with the frame comparator, the first video signal; receiving, with the frame comparator, the second video signal; analyzing, with the frame comparator, the received first video signal and the received second video signal; and determining, with the frame comparator, whether the received first video signal and the received second video signal match to within the predetermined minimal difference.

In some cases, the second video signal might be synchronized with the first video signal to within a predetermined threshold amount. Merely by way of example, in some embodiments, the first device might comprise one of a video encoder, a video decoder, a video encoder/decoder system, a video transcoder, a video storage and replay system, a video transport system, or a video broadcast system, and/or the like.

Various modifications and additions can be made to the embodiments discussed without departing from the scope of the invention. For example, while the embodiments described above refer to particular features, the scope of this invention also includes embodiments having different combination of features and embodiments that do not include all of the above described features.

Specific Exemplary Embodiments

We now turn to the embodiments as illustrated by the drawings. FIGS. 1-7 illustrate some of the features of the method, system, and apparatus for implementing media content streaming or playback, and, more particularly, to methods, systems, and apparatuses for implementing media stream synchronization, as referred to above. The methods, systems, and apparatuses illustrated by FIGS. 1-7 refer to examples of different embodiments that include various components and steps, which can be considered alternatives or which can be used in conjunction with one another in the various embodiments. The description of the illustrated methods, systems, and apparatuses shown in FIGS. 1-7 is provided for purposes of illustration and should not be considered to limit the scope of the different embodiments.

With reference to the figures, FIG. 1 is a schematic diagram illustrating a system 100 for implementing media stream synchronization, in accordance with various embodiments. In the non-limiting embodiment of FIG. 1, system 100 might comprise a synchronization system 105 (which might, in some instances, comprise a synchronization engine or the like), a first device 110 (which might also be referred to herein as "device under test ('DUT')"), a video content source(s) 115 and corresponding database(s) 120, a network(s) 125, a frame buffer delay device 130, one or more display devices 135, a computing system 140 (optional) and corresponding database(s) 145 (optional).

According to some embodiments, the first device 110 might include, without limitation, one of a video encoder, a video decoder, a video encoder/decoder system, a video transcoder, a video storage and replay system, a video transport system, or a video broadcast system, and/or the like.

In operation, generally, the synchronization system 105 might receive a first signal that is output from the first device 110, wherein the first device receives an original video signal from a video source (e.g., video content source(s) 115 and/or database(s) 120, or the like) and outputs a first video signal. The synchronization system 105 might analyze the received first signal to determine a first frame buffer delay, and might generate a first delay adjustment signal based on the determined first frame buffer delay. The synchronization system might send the first delay adjustment signal to a frame buffer delay device. The frame buffer delay device, which is separate from the first device, might receive the original video signal from the video source concurrent with the first device receiving the original video signal from the video source. The first delay adjustment signal would cause the frame buffer delay device to apply the first frame buffer delay to the received original video signal to produce a second video signal that is synchronized with the first video signal. In some cases, the second video signal might be synchronized with the first video signal to within a predetermined threshold amount (which might be in terms of number of frames or number of seconds (or milliseconds), or the like).

In some embodiments, the synchronization system 105 might comprise a timing pattern generator and an analyzer. Non-limiting examples of such embodiments are shown in, and described below with respect to, FIGS. 3A-3F and 5B-5D. In these embodiments, the first signal would comprise a timing pattern.

In alternative embodiments, the synchronization system 105 might comprise a frame comparator. Non-limiting examples of these embodiments are shown in, and described below with respect to, FIGS. 4A-4C, 5E, and 5F. In these embodiments, the first signal would comprise the first video signal.

Merely by way of example, in some instances, computing system 140 (and corresponding database(s) 145) might control the operation of the synchronization system 105, the first device 110, and/or the frame buffer delay device 130. Alternatively, or additionally, computing system 140 might perform additional processing of the video signals that are output by the first device 110 and/or the frame buffer delay device 130. In some cases, the computing system 140, which might be either remote relative to the synchronization system 105 (and accessible via network(s) 125 as shown in FIG. 1) or local to the synchronization system 105 (not shown in FIG. 1), might perform frame-by-frame comparisons to detect video quality impairments (including, but not limited to, video encoding artifacts, noise, dropouts, etc.), and in some cases to further perform visual enhancement of video encoding artifacts or the like, as described in greater detail in the '145 application, which claims priority to '493 application (and which has already been incorporated herein by reference in its entirety for all purposes). Alternatively, or additionally, display device(s) 135 might display the first video signal that is output by the first device 110 and/or might display the second video signal that is output by the frame buffer delay device 130, which either allows a user to view the two video signals and to manual adjust the frame delay.

These and other embodiments are described in detail below with respect to FIGS. 2A-5F below.

FIGS. 2A and 2B (collectively, "FIG. 2") are schematic diagrams illustrating an original video stream 200 (FIG. 2A) and video stream as delayed after passing through a device under test ("DUT"; also referred to herein as "first device") 200' (FIG. 2B), in accordance with various embodiments.

In FIG. 2A, an original video stream 200, at a particular starting time, might comprise frame N+2 205c, frame N+3 205d, frame N+4 205e, frame N+5 205f, etc. In FIG. 2B, a video stream 200' that is delayed after passing through first device or DUT 110 (and which might be referred to herein as "device output" or the like) might comprise frame N 205a, frame N+1 205b, frame N+2 205c, and frame N+3 205d, etc. In the example of FIG. 2, the offset between the original video stream and the device output is two frames. The various embodiments, however, are not so limited, and the offset or delay can be any number of frames depending on the latency of the processing functionalities of the first device or DUT 110. In other words, the first device or DUT 110 imposes a certain amount of signal delay corresponding to the latency.

In order to perform any frame-by-frame comparison between the original video stream 200 and device output stream 200', the two streams have to be synchronized. The '145 application, which claims priority to '493 application (and which has already been incorporated herein by reference in its entirety for all purposes), describes in detail a method and system for implementing detection and visual enhancement of video encoding artifacts that requires as a precedent condition video synchronization of the two video streams, where video synchronization might be implemented, e.g., using the techniques described herein. For example, FIGS. 3A-3F are directed to embodiments for temporarily inserting dedicated timing patterns into the video stream, enabling a video stream synchronization mechanism to determine the amount of latency through the DUT 110. FIGS. 4A-4C are directed to embodiments for determining the difference between the original video stream 200 and the device output stream 200', then adjusting the delay in a frame buffer until the difference between the two video signals is minimized.

Figure 3A:
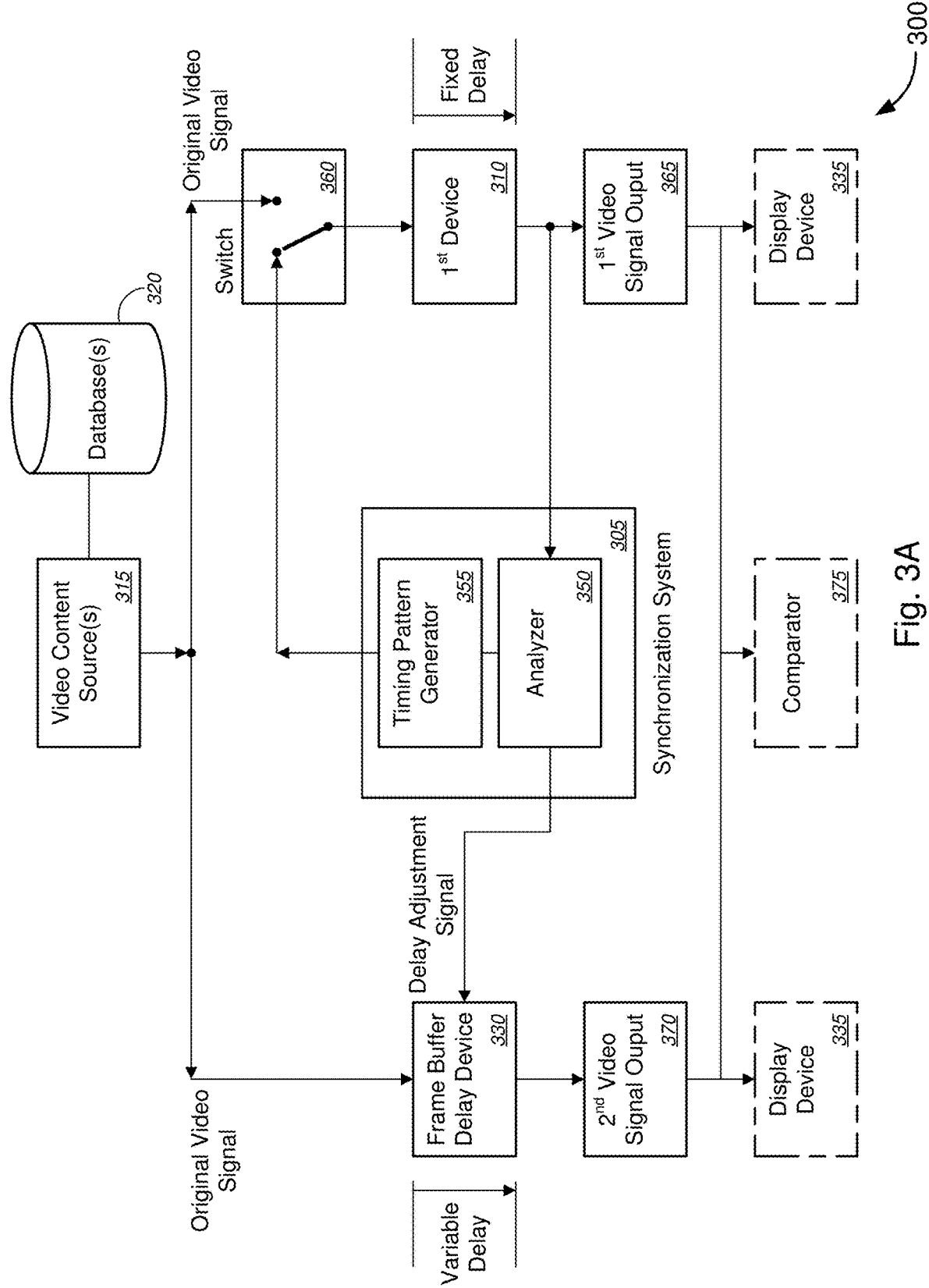
FIGS. 3A and 3B are flow diagrams illustrating another system for implementing media stream synchronization, in accordance with various embodiments.
Figure 3B:
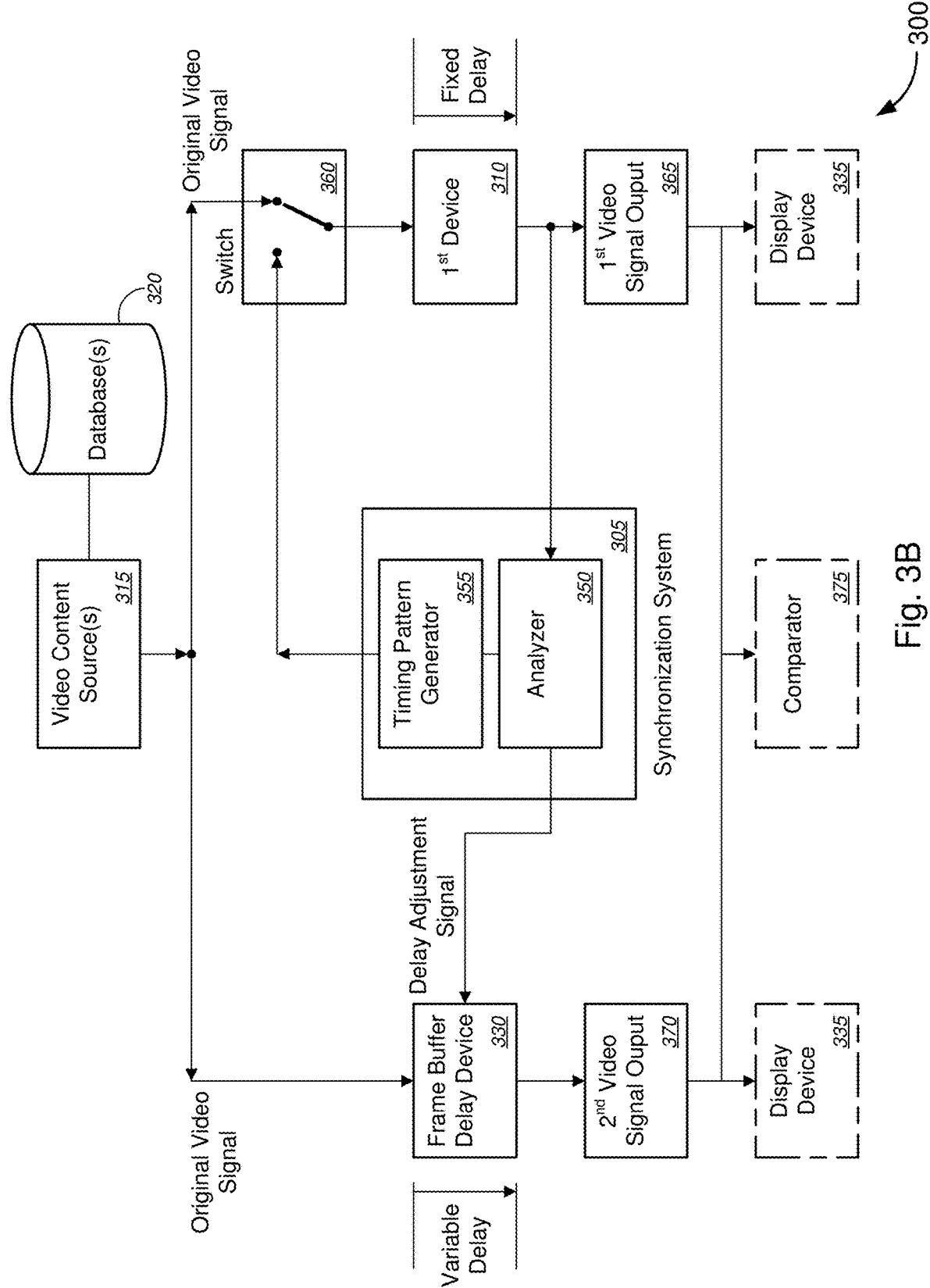
Figure 3D:
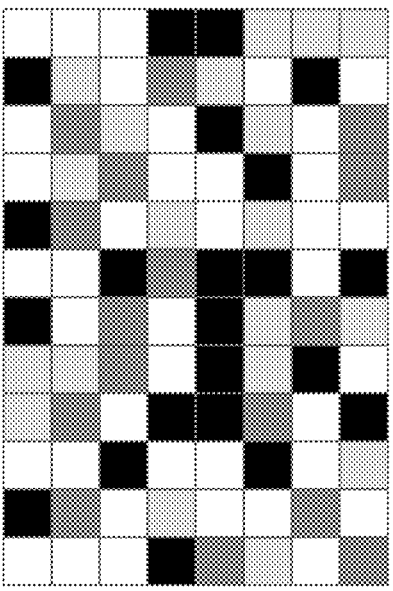
FIGS. 3C-3F are schematic diagrams illustrating various embodiments of timing patterns, in accordance with various embodiments.

We now turn to FIGS. 3A-3F (collectively, "FIG. 3"). FIGS. 3A and 3B are schematic diagrams illustrating another system 300 for implementing media stream synchronization, in accordance with various embodiments. FIGS. 3C-3F are schematic diagrams illustrating various embodiments of timing patterns, in accordance with various embodiments.

In the non-limiting embodiment of FIG. 3, system 300 might comprise synchronization system 305 (which might, in some instances, comprise a synchronization engine or the like), first device 310, video content source(s) 315 database(s) 320, frame buffer delay device 330, display device(s) 335 (optional), analyzer 350, timing pattern generator 355, switch 360, first video signal output 365, second video signal output 370, and computing system or comparator 375 (optional), and/or the like. In the embodiments of FIG. 3, synchronization system 305 might comprise the analyzer 350 and the timing pattern generator 355.

In the non-limiting embodiments of FIG. 3, the original video signal from video content source(s) 315 is split into two: one path feeds into frame buffer delay device 330, which delays the video signal by a variable, adjustable amount; the other path feeds into the DUT 310. The DUT 310 has a fixed delay that needs to be matched by the frame buffer delay device 330. The switch 360 is able to select either the original video signal from the video content source(s) 315 or the timing pattern signal from the timing pattern generator 355 as an input for the DUT 310.

Initially, the switch 360 is set such that the DUT 310 receives its input from synchronization system 305 (which comprises the timing pattern generator 355 and analyzer 350), as shown in FIG. 3A. The synchronization system 305 (comprising the timing pattern generator 355 and analyzer 350) is also able to access the output of the DUT 310. In some embodiments, the synchronization system 305 generates video images containing encoded timing information. These timing patterns serve as time references and enable the timing pattern generator 355 and analyzer 350 to determine the latency of signal processing through the DUT 310.

Once the timing patterns are sent through the DUT 310, the timing pattern generator and analyzer waits for the patterns to appear at the output of the DUT 310. The analyzer 350 has capabilities to recognize the timing information encoded in the patterns. The analyzer 350 uses the information about the time associated with the timing patterns that are injected into the DUT 310 and with the timing patterns that are output by the DUT 310 to determine the latency through the DUT 310.

Once the latency through the DUT 310 has been established, synchronization system 305 (comprising the timing pattern generator 355 and analyzer 350) sends a delay adjustment signal to the frame buffer delay device 330, adjusting its delay to match the latency of DUT 310. In reality, the DUT 310 will likely not delay its video stream in increments corresponding to the exact frame rate of the original video signal, so the variable buffer has to be able to apply delay in much smaller amount, so as to be able to match the delay as precisely as possible.

At this point, both the DUT 310 as well as the frame buffer delay device 330 have the same amount of signal delay. The switch 360 is then set to feed the original video signal into the DUT 310, as shown in FIG. 3B. The video streams at the outputs denoted as first video signal output 365 and second video signal output 370, respectively, are in synchronization (or at least synchronized to within a predetermined threshold amount as described above). This enables an observer or a test instrument to make side-by-side comparisons of the visual video quality of both streams. This setup facilitates the visual or automated detection of video quality impairments potentially imposed by the DUT 310, e.g., video encoding artifacts, noise, dropouts and similar effects. Such detection of video quality impairments (and eventual visual enhancement of video encoding artifacts or the like) is described in greater detail in the '145 application, which claims priority to '493 application (and which has already been incorporated herein by reference in its entirety for all purposes).

Regarding timing patterns, a timing pattern needs to fulfill several requirements: robustness with respect to compression artifacts; redundancy; and simple and low-complexity decoding. In some embodiments, to achieve robustness, timing patterns are designed to be only slightly affected by typical encoding artifacts. In case the input is an encoded video stream, aligning the blocks in the pattern with codec macroblock boundaries of the timing signal reduces video encoding artifacts such as mosquito noise and other undesirable effects, and/or the like. According to some embodiments, redundancy might be achieved by using timing information that is encoded with a sufficient level of redundancy, using suitable methods of error correction. A designer of timing patterns can choose to include a level of redundancy suited to the intended application. Such encoding with redundancy and error correction functionality is as established in the art. In order to reduce overall system complexity, the timing patterns need to be designed to require minimal computational effort for detection and decoding. An implementer may also choose to let users select the type and complexity level of the timing patterns. If few signal impairments are to be expected, a user could select a timing pattern using little or no redundancy. This is of interest where fastest processing and quickest time to video stream synchronization are of interest. The system signals to the user if synchronization cannot be achieved. It can then automatically switch to a timing pattern with more encoding redundancy. Alternatively, a user can intervene and manually select a suitable level of redundancy.

Figure 3C:
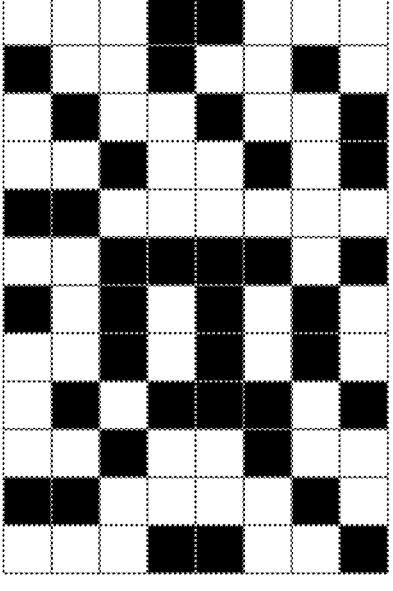
Figure 4A:
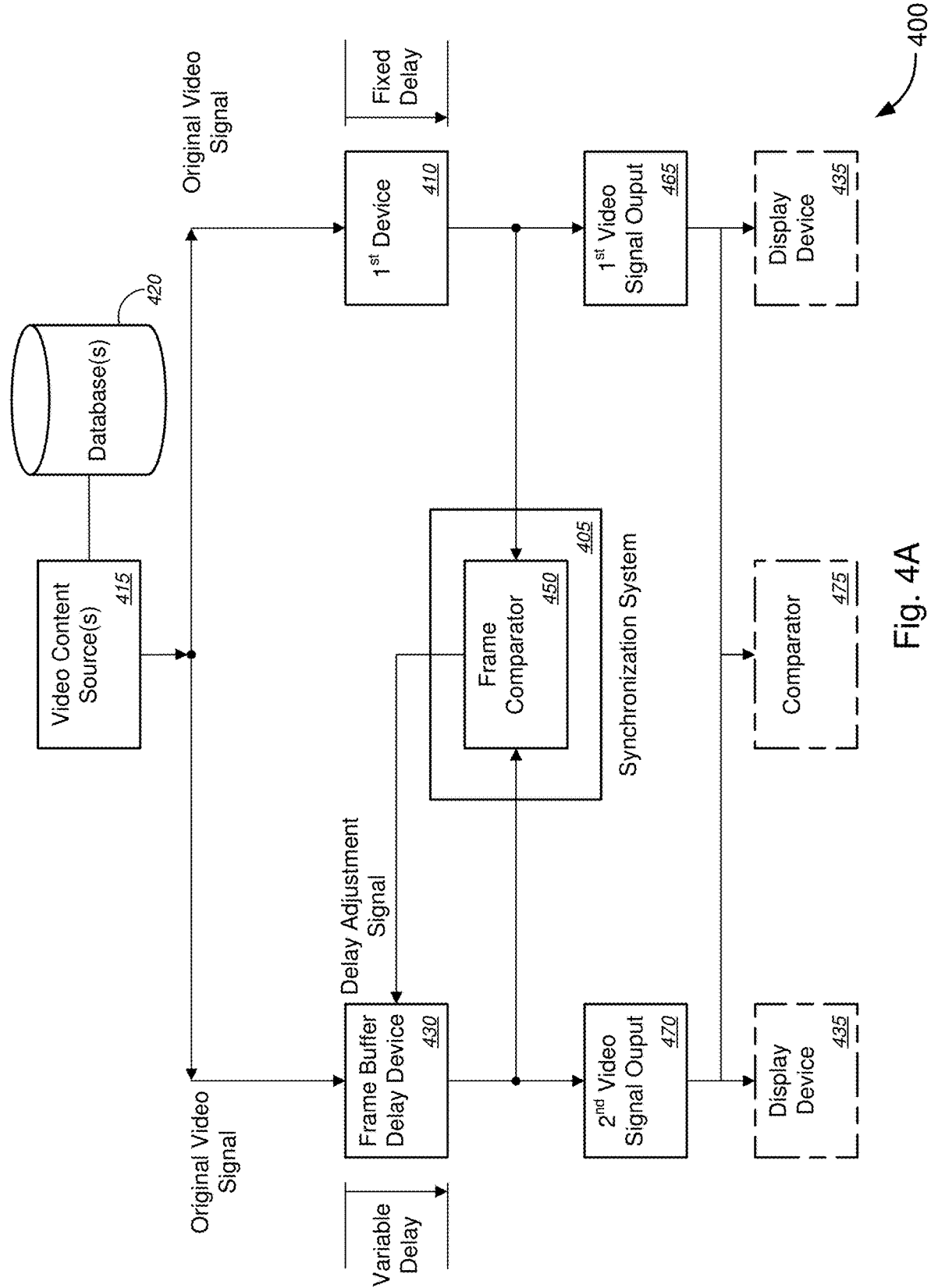
FIG. 4A are flow diagrams illustrating yet another system for implementing media stream synchronization, in accordance with various embodiments.
Figure 4B:
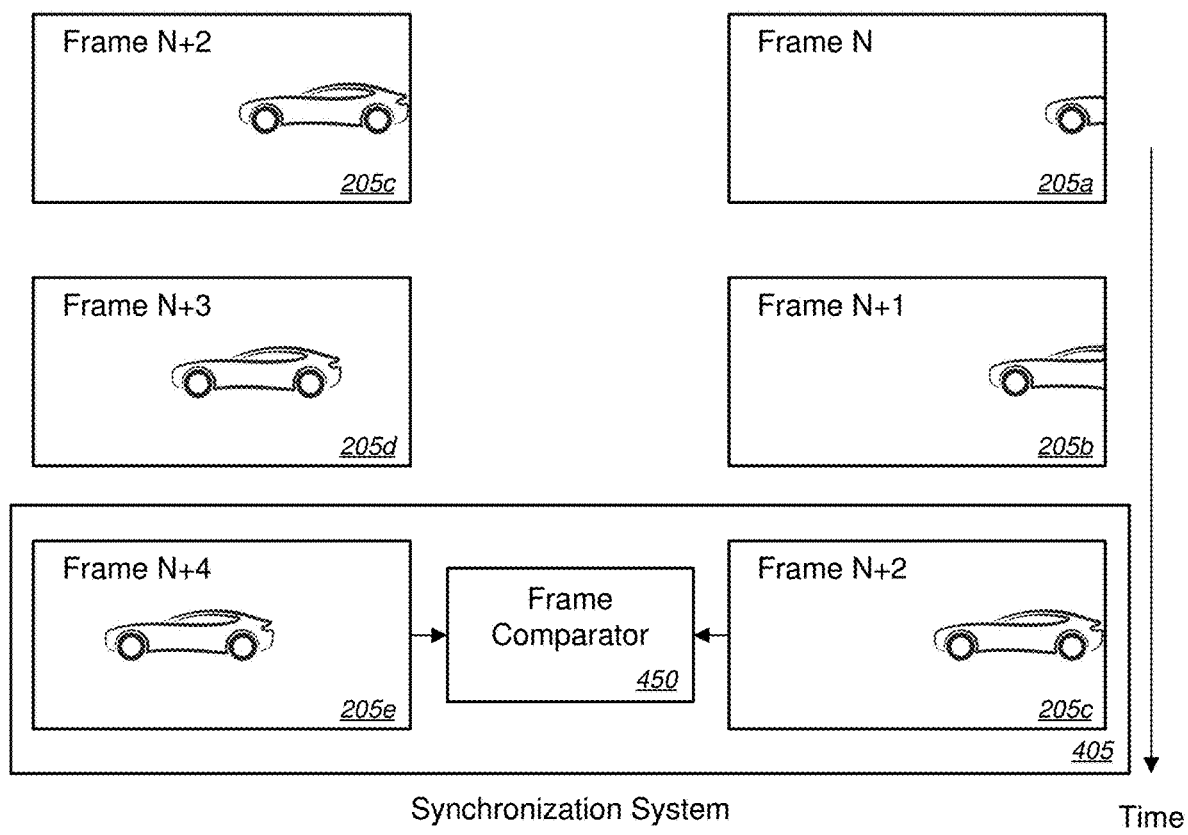
FIGS. 4B and 4C are schematic diagrams illustrating various embodiments of timing patterns, in accordance with various embodiments.
Figure 4C:
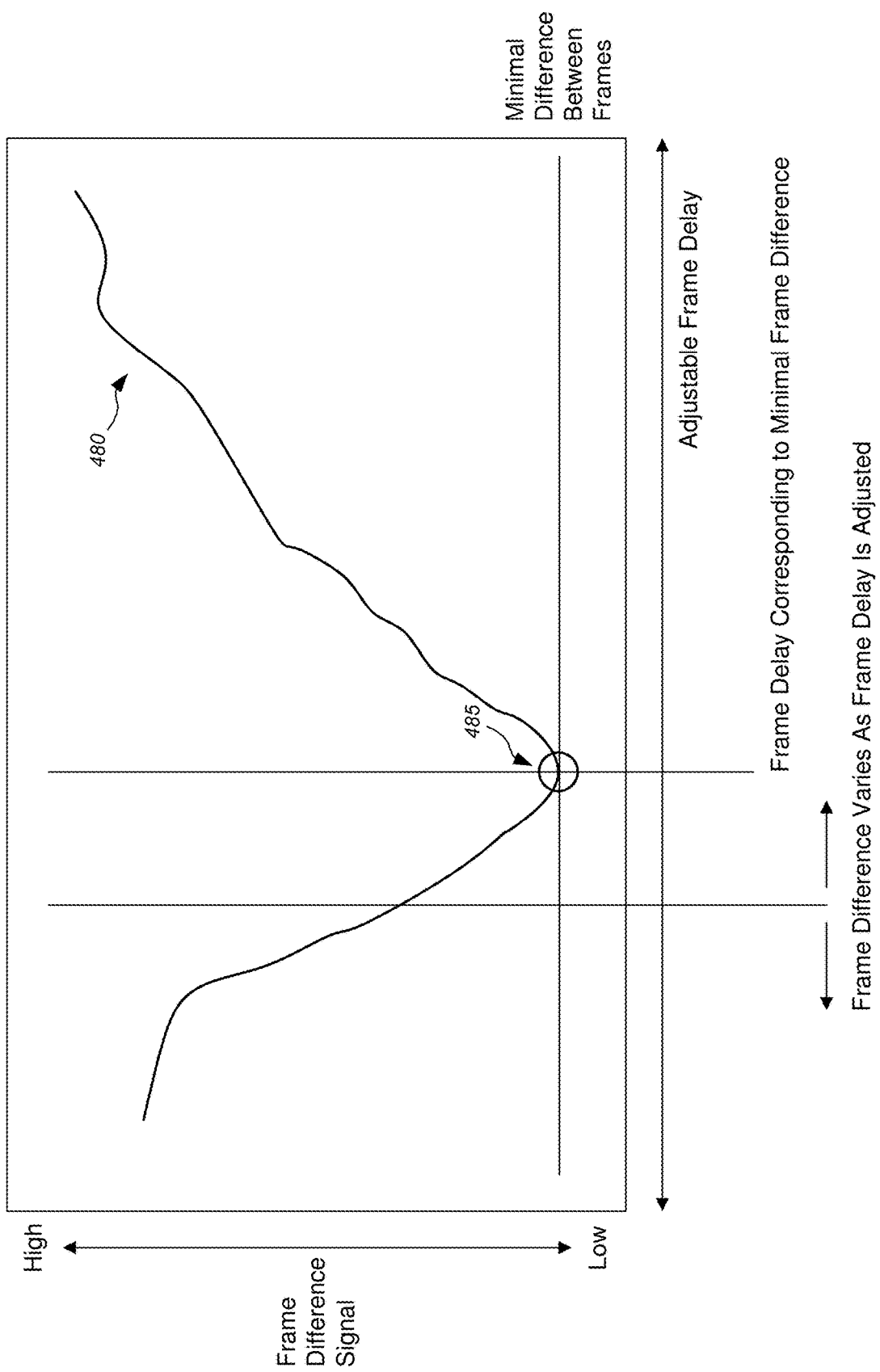

Merely by way of example, according to some embodiments, timing patterns can include, for instance, simple black and white patterns, with black areas representing digital 0's and white patterns representing digital 1's, or vice versa, as shown, e.g., by timing pattern 380a of FIG. 3C. Additional information can be encoded by utilizing grey levels or multiple colors. For example, a pattern using 4 different brightness levels (e.g., white, light grey, dark grey, and black) can encode 2 bits of information per area. Patterns adding color (chrominance) on top of brightness (luminance) information can represent more bits of information per area. Some examples of patterns using black and white as well as grey levels are as shown, e.g., by timing pattern 385a of FIG. 3D. Adding color information (other than simply the light grey and dark grey) further increases the bit-density per field. Patterns can vary in terms of number of fields, shape of fields, and grey levels or colors, and/or the like, that are utilized to encode information (such as timing information or reference information, or the like). In some cases, each individual video frame might be encoded with a dedicated timing pattern.

Figure 3E:
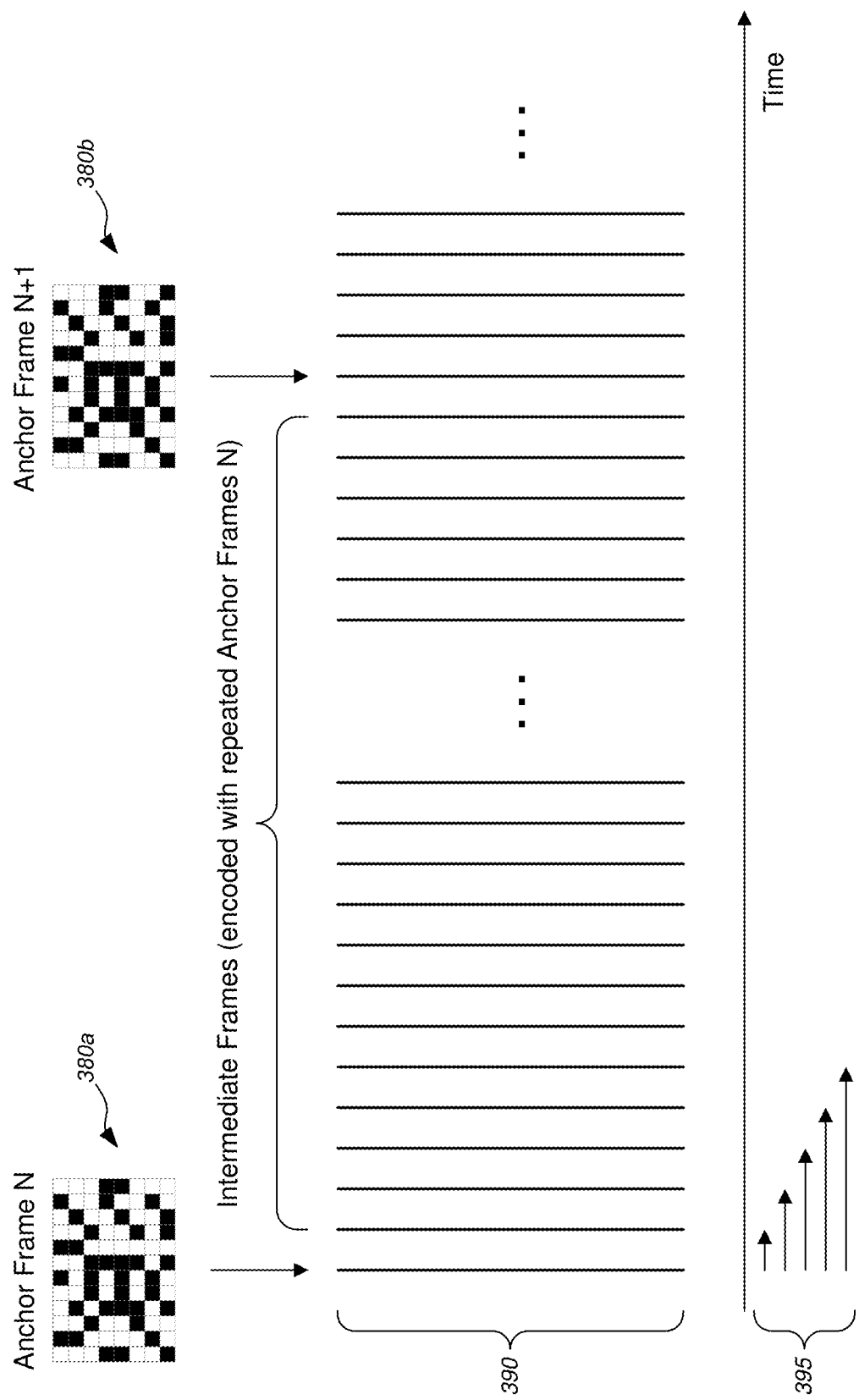

Alternatively, with reference to FIG. 3E, in some embodiments, there is no need to encode each individual video frame with its own dedicated timing pattern. Instead, it is sufficient to have an anchor frame that denotes a new group of video frames. The anchor frame can contain a cyclical counter numbering anchor frames in absolute terms. The video stream synchronizer or synchronization system 305 is then able to simply count video frames starting with the anchor frames and is so able to assign a frame location, sequence, and therefore time to each individual video frame 390, which are spaced apart from each other by intervals 395. These are called intermediate frames and are essentially repeated anchor frames (as shown, e.g., in FIG. 3E). For reasons of stability and overall robustness, anchor frames with new timing information are being inserted in suitable intervals. The length of these intervals can be chosen based on the specific application (automatically or via user input) or based on the output of the DUT 310 (more frequently for DUTs with higher levels of signal impairments and less frequent for DUTs that affect the video signal very little). As shown in FIG. 3E, each anchor frame 380a and 380b (or the like) encodes new timing information. Subsequent frames are called intermediate frames and do not need to be encoded with their own timing information. Instead, the timing pattern generator 355 and analyzer 350 can simply count the frames following an anchor frame. This reduces overall system complexity.

Once a new anchor frame appears in the video stream timing pattern, the video stream synchronizer or synchronization system 305 resets the counter for intermediate frames to zero and increases the counter for anchor frames by 1.

If the video stream synchronizer or synchronization system 305 has access to an encoded video stream, it is beneficial to place the timing pattern anchor frame into an I-frame or key frame, or the like. This ensures the highest possible quality of the timing pattern and therefore highest level of robustness of the timing signal.

This approach is well suited for DUTs where potentially significant video quality impairments are expected. A larger number of anchor frames gives the mechanism a better opportunity to achieve synchronization.

Figure 3F:
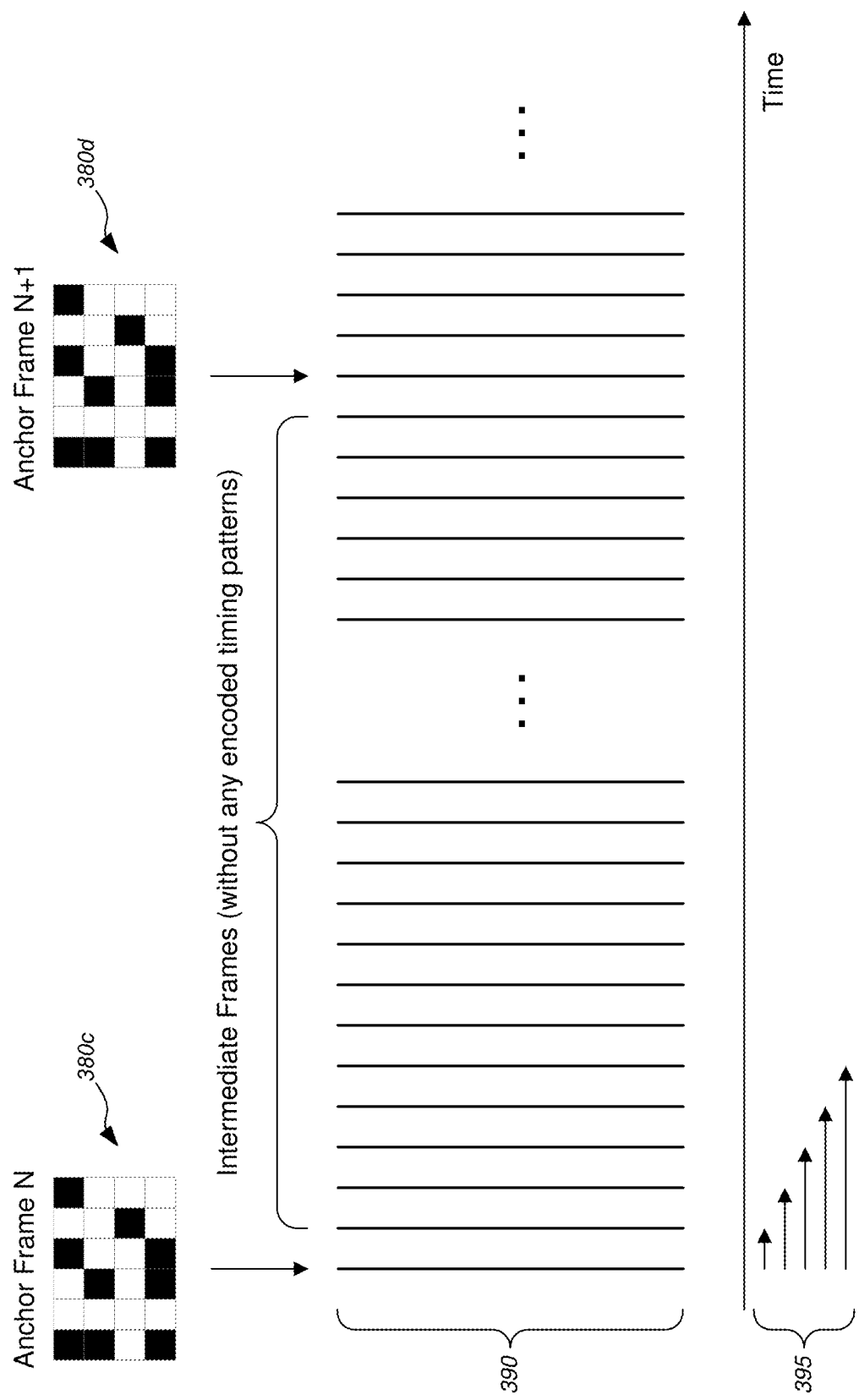

With reference to FIG. 3F, an alternative approach is to insert a single dedicated frame 380c or 380d containing a specific, previously defined pattern suitable for recognition by the video stream synchronizer or synchronization system 305. This pattern does not need to contain any specific timing information and can be of lower complexity than the previously described timing patterns. In this approach, any hardware and software dedicated to recognizing the frame structure can be of lower complexity as well.

The video stream synchronizer or synchronization system 305 then waits for this pattern 380d to appear at the output of the DUT 310. The video stream synchronizer or synchronization system 305 is so able to determine the latency through the DUT 310 and can adjust the delay in the frame buffer to exactly match the latency of DUT 310. This approach is well suited for DUTs where very few video quality impairments are expected. The embodiment of FIG. 3F is otherwise similar, if not identical to, the embodiment of FIG. 3E, and descriptions of the similar aspects of embodiment of FIG. 3E applies to the embodiment of FIG. 3F.

Herein, the synchronization system 305, the first device or DUT 310, the video content source(s) 315 and corresponding database(s) 320, the frame buffer delay device 330, the display device(s) 335, and the computing system or comparator 375 of system 300 of FIGS. 3A and 3B are otherwise similar, if not identical, to the synchronization system 105, the first device or DUT 110, the video content source(s) 115 and corresponding database(s) 120, the frame buffer delay device 130, the display device(s) 135, and the computing system 140 of system 100 of FIG. 1, respectively, and descriptions of the components of system 100 of FIG. 1 apply to the corresponding components of system 300 of FIGS. 3A and 3B.

FIGS. 4A-4C (collectively, "FIG. 4") are directed to an alternative set of embodiments. FIG. 4A is a schematic diagram illustrating yet another system 400 for implementing media stream synchronization, in accordance with various embodiments. FIGS. 4B and 4C are schematic diagrams illustrating various embodiments of timing patterns, in accordance with various embodiments.

In the non-limiting embodiment of FIG. 4, system 400 might comprise synchronization system 405 (which might, in some instances, comprise a synchronization engine or the like), first device 410, video content source(s) 415 database(s) 420, frame buffer delay device 430, display device(s) 435 (optional), frame comparator 450, first video signal output 465, second video signal output 470, and comparator 475 (optional), and/or the like. In the embodiments of FIG. 4, synchronization system 405 might comprise the frame comparator 450.

In the non-limiting embodiments of FIG. 4, the original video signal from video content source(s) 415 is split into two: one path feeds into frame buffer delay device 430, which delays the video signal by a variable, adjustable amount; the other path feeds into the DUT 410. The DUT 410 has a fixed delay that needs to be matched by the frame buffer delay device 430.

The frame comparator 450 receives the first video signal from the output of the first device or DUT 410, while also receiving the second video signal from the output of the frame buffer delay device 430. The frame comparator 450 can use a variety of techniques to compute the difference between the two video streams. Examples of such techniques might include, but are not limited to, one of peak signal-to-noise ratio ("PSNR") technique or root mean square ("RMS") technique, and/or the like. Other techniques can also be employed, depending on the specific application or the video content.

The frame comparator 450 continuously adjusts the delay through frame buffer delay device 430 until a minimal signal difference signal is achieved. At this point, both video streams are synchronized as closely as possible. This approach is illustrated in FIG. 4A.

In FIG. 4B, an original video stream, at a particular starting time, might comprise frame N+2 205*c*, frame N+3 205*d*, and frame N+4 205*e*, etc., while a video stream delayed after passing through first device or DUT 410 (which might be referred to herein as "device output" or the like) might comprise frame N 205*a*, frame N+1 205*b*, and frame N+2 205*c*, etc. In the example of FIG. 4, the offset between the original video stream and the device output is two frames, as described in FIG. 2. The various embodiments, however, are not so limited, and the offset or delay can be any number of frames depending on the latency of the processing functionalities of the first device or DUT 410. In other words, the first device or DUT 410 imposes a certain amount of signal delay corresponding to the latency.

In order to perform any frame-by-frame comparison between the original video stream and device output stream, the two streams have to be synchronized. Frame comparator 450 of synchronization system 405 compares the original video stream and device output stream.

FIG. 4C depicts a qualitative representation of the frame difference signal. The frame comparator 450 continuously computes the difference between frames in both video streams and adjust the delay through the frame buffer delay device 430 until it finds a specific delay corresponding to the lowest difference between both signals. At this point, the streams are synchronized as best as possible. In particular, with reference to FIG. 4C, the curve 480 depicts the frame difference signal at variable adjustable frame delay. As the frame delay is adjusted, the frame difference signal varies until the frame delay corresponds to the minimal frame difference, as illustrated by the circle 485, which highlights the point in the curve 480 at which the frame delay corresponds to the minimal frame difference.

The synchronization system 405, the first device or DUT 410, the video content source(s) 415 and corresponding database(s) 420, the frame buffer delay device 430, the display device(s) 435, and the computing system or comparator 475 of system 400 of FIG. 4A are otherwise similar, if not identical, to the synchronization system 305, the first device or DUT 310, the video content source(s) 315 and corresponding database(s) 320, the frame buffer delay device 330, the display device(s) 335, and the computing system or comparator 375 of system 300 of FIGS. 3A and 3B, respectively, and descriptions of the components of system 300 of FIGS. 3A and 3B apply to the corresponding components of system 400 of FIG. 4.

As described above, the synchronization system 305, the first device or DUT 310, the video content source(s) 315 and corresponding database(s) 320, the frame buffer delay device 330, the display device(s) 335, and the computing system or comparator 375 of system 300 of FIGS. 3A and 3B are otherwise similar, if not identical, to the synchronization system 105, the first device or DUT 110, the video content source(s) 115 and corresponding database(s) 120, the frame buffer delay device 130, the display device(s) 135, and the computing system 140 of system 100 of FIG. 1, respectively, and descriptions of the components of system 100 of FIG. 1 apply to the corresponding components of system 300 of FIGS. 3A and 3B.

Figure 5A:
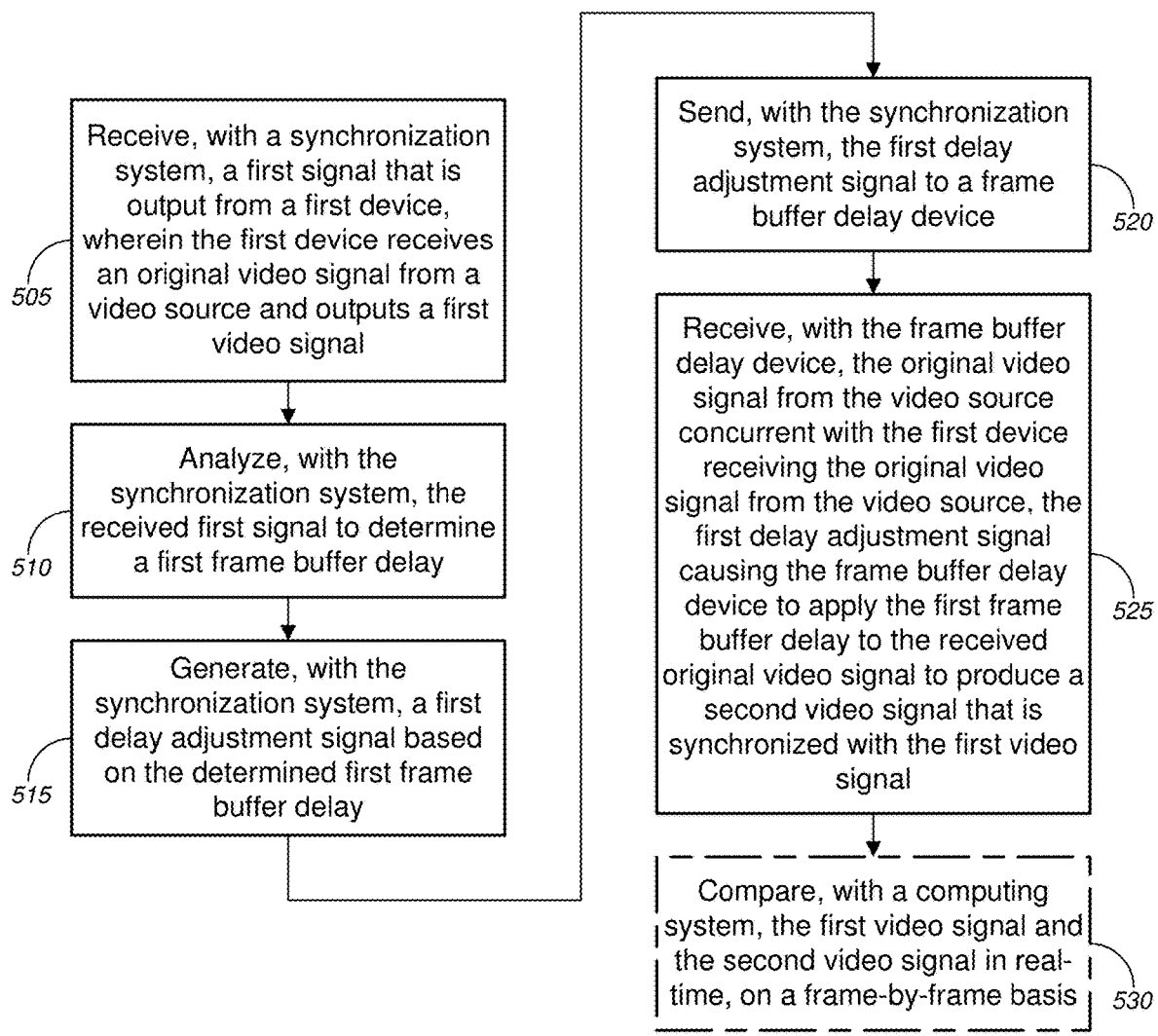
Figure 5B:
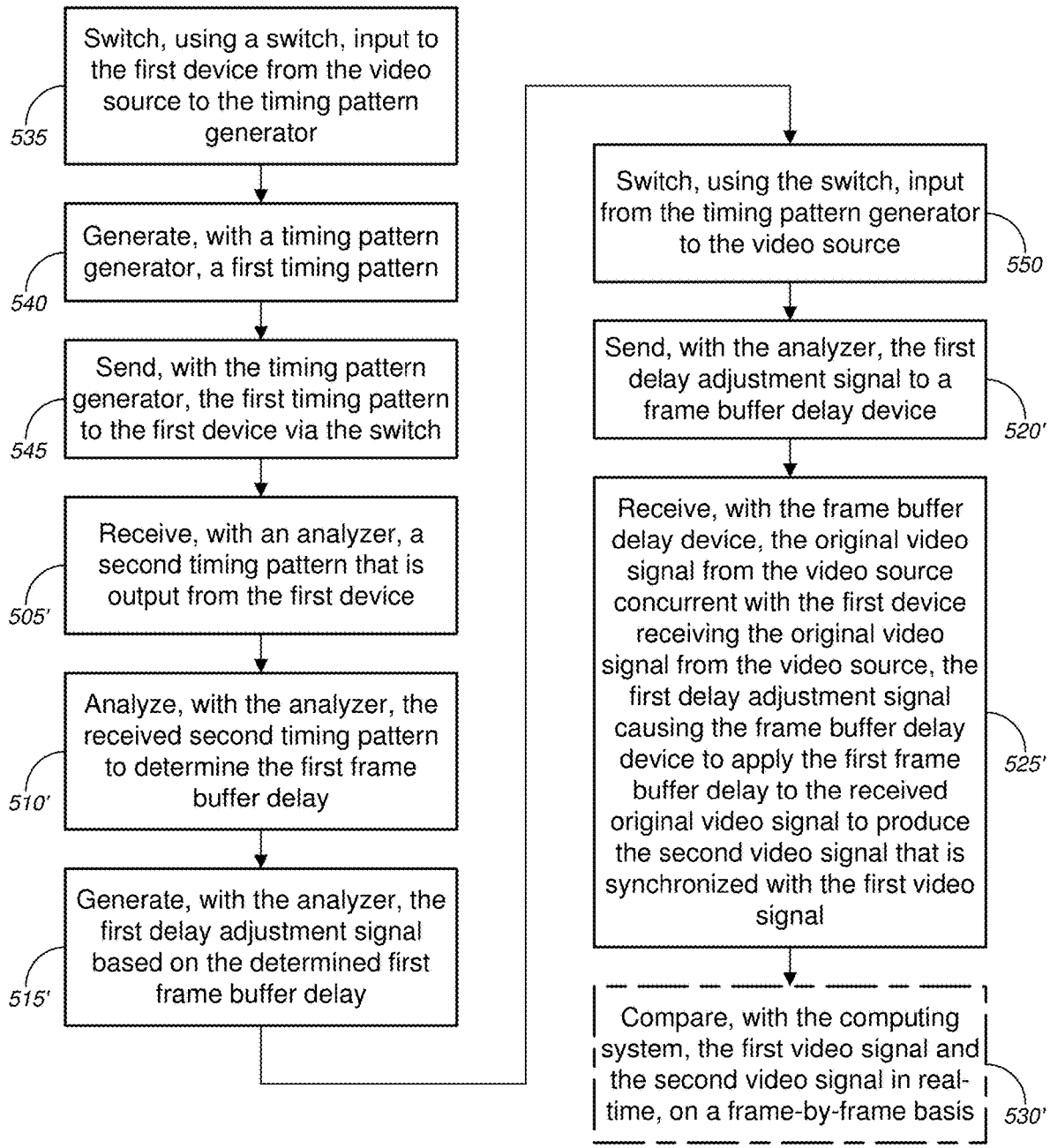
Figure 5E:
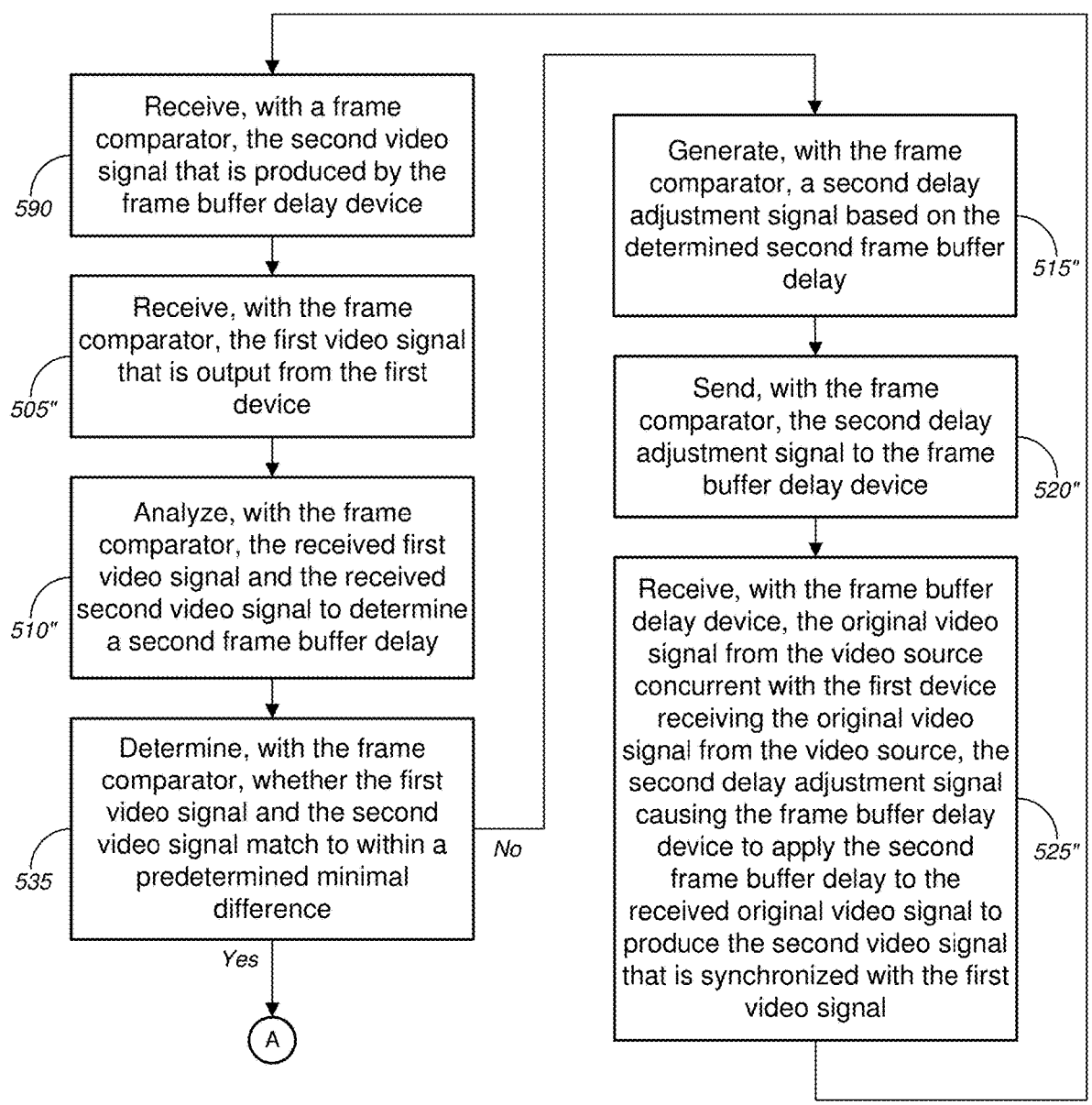

FIGS. 5A-5F (collectively, "FIG. 5") are flow diagrams illustrating a method 500 for implementing media stream synchronization, in accordance with various embodiments. FIG. 5E continues onto FIG. 5F following circular marker denoted, "A."

While the techniques and procedures are depicted and/or described in a certain order for purposes of illustration, it should be appreciated that certain procedures may be reordered and/or omitted within the scope of various embodiments. Moreover, while the method 500 illustrated by FIG. 5 can be implemented by or with (and, in some cases, are described below with respect to) the systems 100, 300, and 400 of FIGS. 1, 3, and 4, respectively (or components thereof), such methods may also be implemented using any suitable hardware (or software) implementation. Similarly, while each of the systems 100, 300, and 400 of FIGS. 1, 3, and 4, respectively (or components thereof), can operate according to the method 500 illustrated by FIG. 5 (e.g., by executing instructions embodied on a computer readable medium), the systems 100, 300, and 400 of FIGS. 1, 3, and 4 can each also operate according to other modes of operation and/or perform other suitable procedures.

In the non-limiting embodiment of FIG. 5A, method 500, at block 505, might comprise receiving, with a synchronization system, a first signal that is output from a first device. The first device receives an original video signal from a video source and outputs a first video signal. Merely by way of example, in some instances, the first device might include, without limitation, one of a video encoder, a video decoder, a video encoder/decoder system, a video transcoder, a video storage and replay system, a video transport system, or a video broadcast system, and/or the like.

At block 510, method 500 might comprise analyzing, with the synchronization system, the received first signal to determine a first frame buffer delay. Method 500 might comprise generating, with the synchronization system, a first delay adjustment signal based on the determined first frame buffer delay (block 515) and sending, with the synchronization system, the first delay adjustment signal to a frame buffer delay device (block 520). Method 500 might comprise, at block 525, receiving, with the frame buffer delay device, the original video signal from the video source concurrent with the first device receiving the original video signal from the video source. The first delay adjustment signal causes the frame buffer delay device to apply the first frame buffer delay to the received original video signal to produce a second video signal that is synchronized with the first video signal.

In some embodiments, the second video signal might be synchronized with the first video signal to within a predetermined threshold amount. According to some embodiments, method 500 might further comprise comparing, with a computing system, the first video signal and the second video signal in real-time, on a frame-by-frame basis (optional block 530). In some cases, the computing system (which might correspond to computing system 140 of FIG. 1 or comparator 375 or 475 of FIG. 3 or 4, or the like), which might be either remote relative to the synchronization system 105 (and accessible via network(s) 125 as shown, e.g., in FIG. 1, or the like) or local to the synchronization system 105 (as shown, e.g., in FIGS. 3 and 4, or the like), might perform frame-by-frame comparisons to detect video quality impairments (including, but not limited to, video encoding artifacts, noise, dropouts, etc.), and in some cases to further perform visual enhancement of video encoding artifacts or the like, as described in greater detail in the '145 application, which claims priority to '493 application and which has already been incorporated herein by reference in its entirety for all purposes.

With reference to embodiments that implement media stream synchronization using systems such as system 300 of FIG. 3, the synchronization system might comprise a timing pattern generator and an analyzer. In some embodiments, the timing pattern generator and the analyzer might be part of an integrated timing pattern generator-analyzer system. In some instances, the first signal might comprise a second timing pattern. Referring to FIG. 5B, method 500 might comprise, at block 535, switching, using a switch, input to the first device from the video source to the timing pattern generator. Method 500 might comprise generating, with the timing pattern generator, a first timing pattern (block 540) and sending, with the timing pattern generator, the first timing pattern to the first device via the switch (block 545). Method 500, at block 505', might comprise receiving, with the analyzer, the second timing pattern that is output from the first device. At block 510', method 500 might comprise analyzing, with the analyzer, the received second timing pattern to determine the first frame buffer delay. Method 500 might comprise generating, with the analyzer, the first delay adjustment signal based on the determined first frame buffer delay (block 515') and switching, using the switch, input to the first device from the timing pattern generator to the video source (block 550). The first device subsequently receives the original video signal from the video source and outputs the first video signal.

Method 500, at block 520', might comprise sending, with the analyzer, the first delay adjustment signal to the frame buffer delay device. Method 500 might further comprise, at block 525', receiving, with the frame buffer delay device, the original video signal from the video source concurrent with the first device receiving the original video signal from the video source. The first delay adjustment signal causes the frame buffer delay device to apply the first frame buffer delay to the received original video signal to produce the second video signal that is synchronized with the first video signal. According to some embodiments, method 500 might further comprise comparing, with the computing system, the first video signal and the second video signal in real-time, on a frame-by-frame basis (optional block 530').

In some embodiments, with reference to FIG. 5C, the first timing pattern might comprise a first anchor frame pattern of a plurality of anchor frame patterns, each of the plurality of anchor frame patterns being different from each other of the plurality of anchor frame patterns. In some cases, the first anchor frame pattern of the plurality of anchor frame patterns might be encoded on a first frame of the original video signal and a second anchor frame pattern of the plurality of anchor frame patterns might be encoded on a second frame of the original video signal. In some instances, the first frame and the second frame are separated by a predetermined number of frames of the original video signal, with intermediate frame patterns being encoded on intermediate frames of the original video signal between the first frame and the second frame (as shown, e.g., in the non-limiting embodiment of FIG. 3E or the like). In some cases, each intermediate frame pattern is the same as the first anchor frame pattern. Alternatively, each intermediate frame pattern might be a timing pattern different from the first anchor frame pattern, and, in some cases, might be a simpler timing pattern. According to some embodiments, analyzing the second timing pattern to determine the first frame buffer delay (at block 510') might comprise: initiating, with the analyzer, a counter when a first anchor frame of the plurality of anchor frame patterns is sent to the first device (block 555); stopping, with the analyzer, the counter when the second timing pattern is received from the output of the first device (block 560); analyzing, with the analyzer, the second timing pattern to identify a third anchor frame of the plurality of anchor frame patterns (block 565); and determining, with the analyzer, the first frame buffer delay, based on a value of the counter when stopped, with respect to the third anchor frame (block 570).

In some cases, sending the first anchor frame to the first device might comprise encoding the first anchor frame on a frame of the original video signal. In some instances, the counter might comprise a clock or the like. Merely by way of example, in some embodiments, each of the first anchor frame and the second anchor frame (as well as the third anchor frame) might comprise timing information. In this way, it can be determined how long it takes for a determined number of frames (i.e., the number of frames between the third anchor frame and the first anchor frame, and whether the third anchor frame is an intermediate frame or the first instance of the third anchor frame) to be processed by the first device, as measured by the counter.

In alternative embodiments, with reference to FIG. 5D, the first timing pattern and the second timing pattern might be the same pattern. In some instances, the first timing pattern and the second timing pattern are encoded on a first frame and a second frame, respectively, of the original video signal. In some cases, no timing patterns are encoded on each intermediate frame of a plurality of intermediate frames between the first frame and the second frame (as shown, e.g., in the non-limiting embodiment of FIG. 3F or the like). According to some cases, the plurality of intermediate frames between the first frame and the second frame might comprise a predetermined number of intermediate frames. In some embodiments, analyzing the second timing pattern to determine the first frame buffer delay (at block 510') might comprise: initiating, with the analyzer, a counter when the first timing pattern is sent to the first device (block 575); stopping, with the analyzer, the counter when the second timing pattern is received from the output of the first device (block 580); and determining, with the analyzer, the first frame buffer delay, based on a value of the counter when stopped and based on the predetermined number of intermediate frames between the first frame and the second frame (block 585).

In some cases, sending the first timing pattern to the first device via the switch might comprise encoding, with the timing pattern generator, the first timing pattern on the first frame of the original video signal. In some instances, the counter might comprise a clock or the like. In this way, it can be determined how long it takes for the predetermined number of frames (i.e., the predetermined number of frames between the second anchor frame and the first anchor frame) to be processed by the first device, as measured by the counter. Further, this alternative approach can be implemented without use of any specific timing information in the timing patterns and/or can be implemented using timing patterns of lower complexity compared to the embodiment described above with respect to FIG. 5C.

With reference to embodiments that implement media stream synchronization using systems such as system 400 of FIG. 4, the synchronization system might comprise a frame comparator. Method 500 might comprise, at block 590, receiving, with the frame comparator, the second video signal that is produced by the frame buffer delay device. Method 500, at block 505", might comprise receiving, with the frame comparator, the first video signal that is output from the first device, which receives the original video signal from the video source. At block 510", method 500 might comprise analyzing, with the frame comparator, the received first video signal and the received second video signal to determine a second frame buffer delay. Method 500 might further comprise, at block 535, determining, with the frame comparator, whether the first video signal and the second video signal match to within a predetermined minimal difference. In some cases, determining whether the first video signal and the second video signal match to within the predetermined minimal difference might comprise computing, with the frame comparator, a difference signal between the first video signal and the second video signal; and analyzing, with the frame comparator, the difference signal with respect to the predetermined minimal difference, in a manner such as described above with respect to FIG. 4C or the like. Based on a determination that a difference between the received first video signal and the received second video signal exceeds the predetermined minimal difference, method 500 proceeds to block 515".

At block 515", method 500 might comprise generating, with the frame comparator, a second delay adjustment signal based on the determined second frame buffer delay. Method 500, at block 520", might comprise sending, with the frame comparator, the second delay adjustment signal to the frame buffer delay device. Method 500 might further comprise, at block 525", receiving, with the frame buffer delay device, the original video signal from the video source concurrent with the first device receiving the original video signal from the video source. The second delay adjustment signal causes the frame buffer delay device to apply the second frame buffer delay to the received original video signal to produce the second video signal that is synchronized with the first video signal. Method 500 then loops back to the process at block 590, until method 500 returns to the process at block 535, and will continue looping until the second video signal matches the first video signal to within the predetermined minimal difference.

Figure 5F:
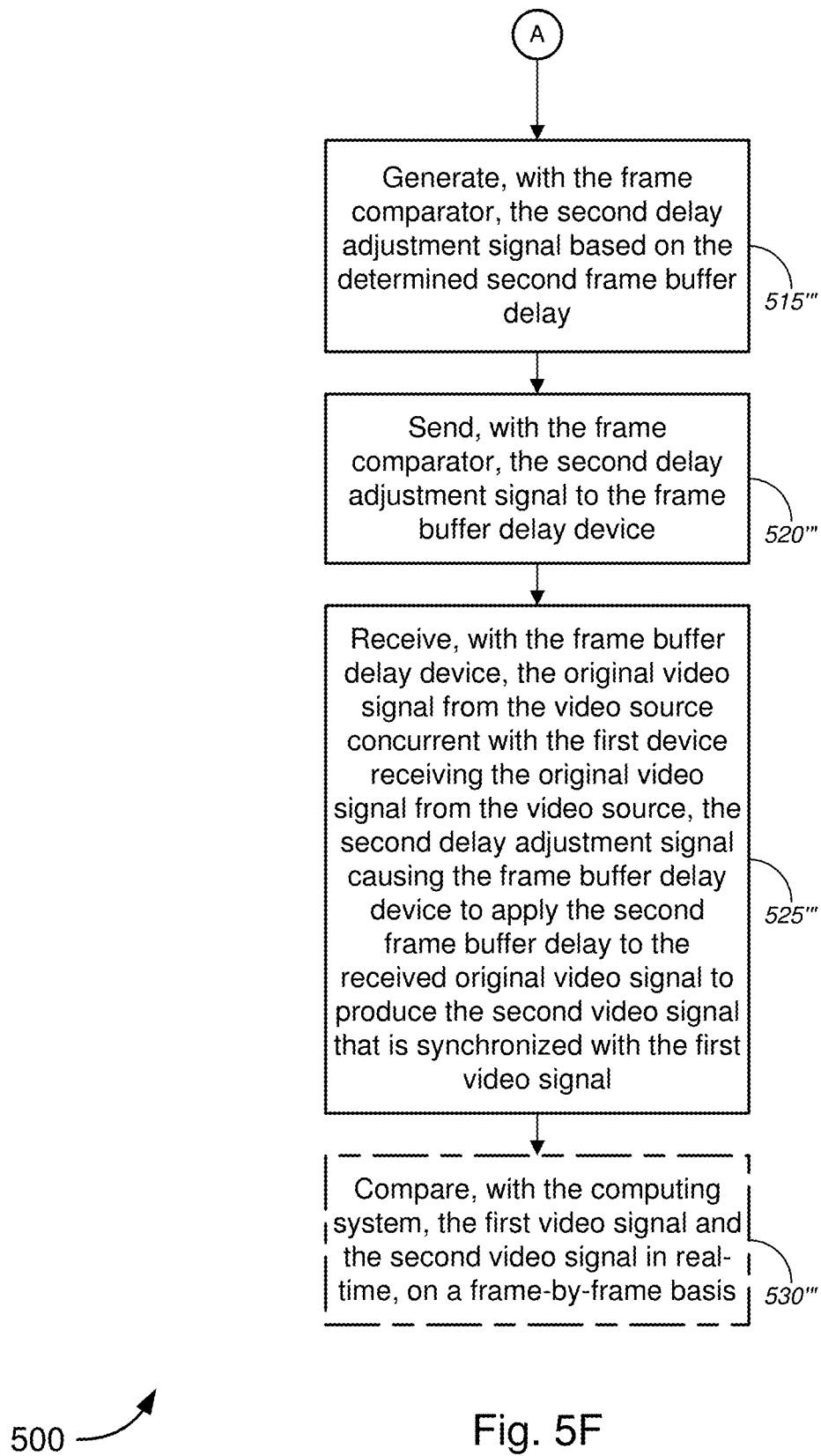

Based on a determination that the received first video signal and the received second video signal match each other to within the predetermined minimal difference, method 500 proceeds to block 515''' in FIG. 5F following the circular marker denoted, "A." In some embodiments, determining whether the first video signal and the second video signal match to within the predetermined minimal difference might comprise utilizing one of peak signal-to-noise ratio ("PSNR") technique or root mean square ("RMS") technique, and/or the like.

At block 515''', method 500 might comprise generating, with the frame comparator, the second delay adjustment signal based on the determined second frame buffer delay. Method 500, at block 520''', might comprise sending, with the frame comparator, the second delay adjustment signal to the frame buffer delay device. Method 500 might further comprise, at block 525''', receiving, with the frame buffer delay device, the original video signal from the video source concurrent with the first device receiving the original video signal from the video source. The second delay adjustment signal causes the frame buffer delay device to apply the second frame buffer delay to the received original video signal to produce the second video signal that is synchronized with the first video signal. According to some embodiments, method 500 might further comprise comparing, with the computing system, the first video signal and the second video signal in real-time, on a frame-by-frame basis (optional block 530''').

Exemplary System and Hardware Implementation

Figure 6:
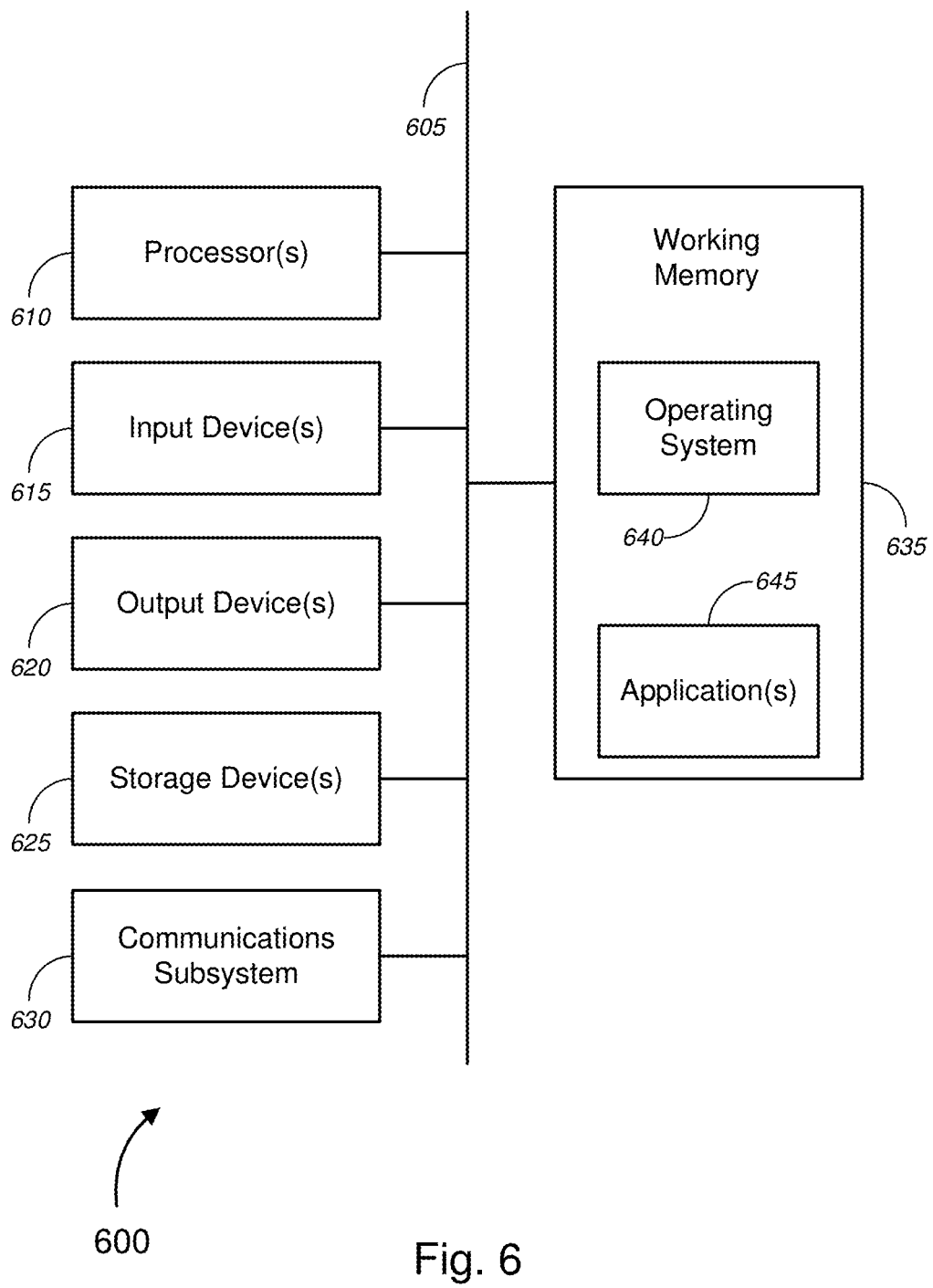
FIG. 6 is a block diagram illustrating an exemplary computer or system hardware architecture, in accordance with various embodiments.

FIG. 6 is a block diagram illustrating an exemplary computer or system hardware architecture, in accordance with various embodiments. FIG. 6 provides a schematic illustration of one embodiment of a computer system 600 of the service provider system hardware that can perform the methods provided by various other embodiments, as described herein, and/or can perform the functions of computer or hardware system (i.e., synchronization systems or engines 105, 305, and 405, first devices 110, 310, and 410, video content sources 115, 315, and 415, frame buffer delay devices 130, 330, and 430, display devices 135, 335, and 435, computing system 140, analyzer 350, timing pattern generator 355, switch 360, comparator 375 and 475, frame comparator 450, etc.), as described above. It should be noted that FIG. 6 is meant only to provide a generalized illustration of various components, of which one or more (or none) of each may be utilized as appropriate. FIG. 6, therefore, broadly illustrates how individual system elements may be implemented in a relatively separated or relatively more integrated manner.

The computer or hardware system 600—which might represent an embodiment of the computer or hardware system (i.e., synchronization systems or engines 105, 305, and 405, first devices 110, 310, and 410, video content sources 115, 315, and 415, frame buffer delay devices 130, 330, and 430, display devices 135, 335, and 435, computing system 140, analyzer 350, timing pattern generator 355, switch 360, comparator 375 and 475, frame comparator 450, etc.), described above with respect to FIGS. 1-5—is shown comprising hardware elements that can be electrically coupled via a bus 605 (or may otherwise be in communication, as appropriate). The hardware elements may include one or more processors 610, including, without limitation, one or more general-purpose processors and/or one or more special-purpose processors (such as microprocessors, digital signal processing chips, graphics acceleration processors, and/or the like); one or more input devices 615, which can include, without limitation, a mouse, a keyboard and/or the like; and one or more output devices 620, which can include, without limitation, a display device, a printer, and/or the like.

The computer or hardware system 600 may further include (and/or be in communication with) one or more storage devices 625, which can comprise, without limitation, local and/or network accessible storage, and/or can include, without limitation, a disk drive, a drive array, an optical storage device, solid-state storage device such as a random access memory ("RAM") and/or a read-only memory ("ROM"), which can be programmable, flash-updateable and/or the like. Such storage devices may be configured to implement any appropriate data stores, including, without limitation, various file systems, database structures, and/or the like.

The computer or hardware system 600 might also include a communications subsystem 630, which can include, without limitation, a modem, a network card (wireless or wired), an infra-red communication device, a wireless communication device and/or chipset (such as a Bluetooth™ device, an 802.11 device, a WiFi device, a WiMax device, a WWAN device, cellular communication facilities, etc.), and/or the like. The communications subsystem 630 may permit data to be exchanged with a network (such as the network described below, to name one example), with other computer or hardware systems, and/or with any other devices described herein. In many embodiments, the computer or hardware system 600 will further comprise a working memory 635, which can include a RAM or ROM device, as described above.

The computer or hardware system 600 also may comprise software elements, shown as being currently located within the working memory 635, including an operating system 640, device drivers, executable libraries, and/or other code, such as one or more application programs 645, which may comprise computer programs provided by various embodiments (including, without limitation, hypervisors, VMs, and the like), and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be encoded and/or stored on a non-transitory computer readable storage medium, such as the storage device(s) 625 described above. In some cases, the storage medium might be incorporated within a computer system, such as the system 600. In other embodiments, the storage medium might be separate from a computer system (i.e., a removable medium, such as a compact disc, etc.), and/or provided in an installation package, such that the storage medium can be used to program, configure and/or adapt a general purpose computer with the instructions/code stored thereon. These instructions might take the form of executable code, which is executable by the computer or hardware system 600 and/or might take the form of source and/or installable code, which, upon compilation and/or installation on the computer or hardware system 600 (e.g., using any of a variety of generally available compilers, installation programs, compression/decompression utilities, etc.) then takes the form of executable code.

It will be apparent to those skilled in the art that substantial variations may be made in accordance with specific requirements. For example, customized hardware (such as programmable logic controllers, field-programmable gate arrays, application-specific integrated circuits, and/or the like) might also be used, and/or particular elements might be implemented in hardware, software (including portable software, such as applets, etc.), or both. Further, connection to other computing devices such as network input/output devices may be employed.

As mentioned above, in one aspect, some embodiments may employ a computer or hardware system (such as the computer or hardware system 600) to perform methods in accordance with various embodiments of the invention. According to a set of embodiments, some or all of the procedures of such methods are performed by the computer or hardware system 600 in response to processor 610 executing one or more sequences of one or more instructions (which might be incorporated into the operating system 640 and/or other code, such as an application program 645) contained in the working memory 635. Such instructions may be read into the working memory 635 from another computer readable medium, such as one or more of the storage device(s) 625. Merely by way of example, execution of the sequences of instructions contained in the working memory 635 might cause the processor(s) 610 to perform one or more procedures of the methods described herein.

The terms "machine readable medium" and "computer readable medium," as used herein, refer to any medium that participates in providing data that causes a machine to operate in a specific fashion. In an embodiment implemented using the computer or hardware system 600, various computer readable media might be involved in providing instructions/code to processor(s) 610 for execution and/or might be used to store and/or carry such instructions/code (e.g., as signals). In many implementations, a computer readable medium is a non-transitory, physical, and/or tangible storage medium. In some embodiments, a computer readable medium may take many forms, including, but not limited to, non-volatile media, volatile media, or the like. Non-volatile media includes, for example, optical and/or magnetic disks, such as the storage device(s) 625. Volatile media includes, without limitation, dynamic memory, such as the working memory 635. In some alternative embodiments, a computer readable medium may take the form of transmission media, which includes, without limitation, coaxial cables, copper wire and fiber optics, including the wires that comprise the bus 605, as well as the various components of the communication subsystem 630 (and/or the media by which the communications subsystem 630 provides communication with other devices). In an alternative set of embodiments, transmission media can also take the form of waves (including without limitation radio, acoustic and/or light waves, such as those generated during radio-wave and infra-red data communications).

Common forms of physical and/or tangible computer readable media include, for example, a floppy disk, a flexible disk, a hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read instructions and/or code.

Various forms of computer readable media may be involved in carrying one or more sequences of one or more instructions to the processor(s) 610 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer or hardware system 600. These signals, which might be in the form of electromagnetic signals, acoustic signals, optical signals, and/or the like, are all examples of carrier waves on which instructions can be encoded, in accordance with various embodiments of the invention.

The communications subsystem 630 (and/or components thereof) generally will receive the signals, and the bus 605 then might carry the signals (and/or the data, instructions, etc. carried by the signals) to the working memory 635, from which the processor(s) 605 retrieves and executes the instructions. The instructions received by the working memory 635 may optionally be stored on a storage device 625 either before or after execution by the processor(s) 610.

Figure 7:
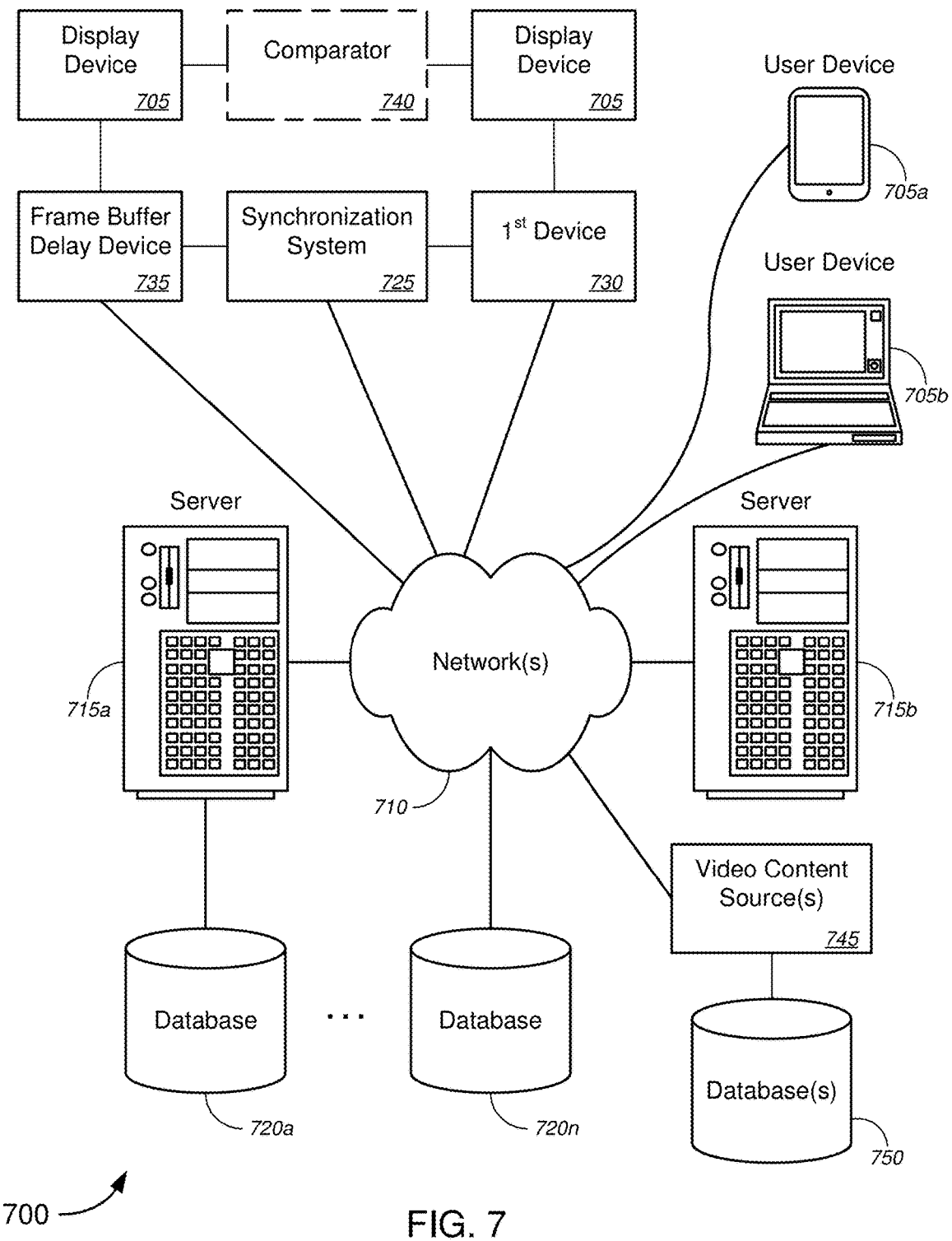
FIG. 7 is a block diagram illustrating a networked system of computers, computing systems, or system hardware architecture, which can be used in accordance with various embodiments.

As noted above, a set of embodiments comprises methods and systems for implementing media content streaming or playback, and, more particularly, to methods, systems, and apparatuses for implementing media stream synchronization. FIG. 7 illustrates a schematic diagram of a system 700 that can be used in accordance with one set of embodiments. The system 700 can include one or more user computers, user devices, or customer devices 705. A user computer, user device, or customer device 705 can be a general purpose personal computer (including, merely by way of example, desktop computers, tablet computers, laptop computers, handheld computers, and the like, running any appropriate operating system, several of which are available from vendors such as Apple, Microsoft Corp., and the like), cloud computing devices, a server(s), and/or a workstation computer(s) running any of a variety of commercially-available UNIX™ or UNIX-like operating systems. A user computer, user device, or customer device 705 can also have any of a variety of applications, including one or more applications configured to perform methods provided by various embodiments (as described above, for example), as well as one or more office applications, database client and/or server applications, and/or web browser applications. Alternatively, a user computer, user device, or customer device 705 can be any other electronic device, such as a thin-client computer, Internet-enabled mobile telephone, and/or personal digital assistant, capable of communicating via a network (e.g., the network(s) 710 described below) and/or of displaying and navigating web pages or other types of electronic documents. Although the exemplary system 700 is shown with two user computers, user devices, or customer devices 705, any number of user computers, user devices, or customer devices can be supported.

Certain embodiments operate in a networked environment, which can include a network(s) 710. The network(s) 710 can be any type of network familiar to those skilled in the art that can support data communications using any of a variety of commercially-available (and/or free or proprietary) protocols, including, without limitation, TCP/IP, SNA™, IPX™, AppleTalk™, and the like. Merely by way of example, the network(s) 710 (similar to network(s) 125 FIG. 1, or the like) can each include a local area network ("LAN"), including, without limitation, a fiber network, an Ethernet network, a Token-Ring™ network and/or the like; a wide-area network ("WAN"); a wireless wide area network ("WWAN"); a virtual network, such as a virtual private network ("VPN"); the Internet; an intranet; an extranet; a public switched telephone network ("PSTN"); an infra-red network; a wireless network, including, without limitation, a network operating under any of the IEEE 802.11 suite of protocols, the Bluetooth™ protocol known in the art, and/or any other wireless protocol; and/or any combination of these and/or other networks. In a particular embodiment, the network might include an access network of the service provider (e.g., an Internet service provider ("ISP")). In another embodiment, the network might include a core network of the service provider, and/or the Internet.

Embodiments can also include one or more server computers 715. Each of the server computers 715 may be configured with an operating system, including, without limitation, any of those discussed above, as well as any commercially (or freely) available server operating systems. Each of the servers 715 may also be running one or more applications, which can be configured to provide services to one or more clients 705 and/or other servers 715.

Merely by way of example, one of the servers 715 might be a data server, a web server, a cloud computing device(s), or the like, as described above. The data server might include (or be in communication with) a web server, which can be used, merely by way of example, to process requests for web pages or other electronic documents from user computers 705. The web server can also run a variety of server applications, including HTTP servers, FTP servers, CGI servers, database servers, Java servers, and the like. In some embodiments of the invention, the web server may be configured to serve web pages that can be operated within a web browser on one or more of the user computers 705 to perform methods of the invention.

The server computers 715, in some embodiments, might include one or more application servers, which can be configured with one or more applications accessible by a client running on one or more of the client computers 705 and/or other servers 715. Merely by way of example, the server(s) 715 can be one or more general purpose computers capable of executing programs or scripts in response to the user computers 705 and/or other servers 715, including, without limitation, web applications (which might, in some cases, be configured to perform methods provided by various embodiments). Merely by way of example, a web application can be implemented as one or more scripts or programs written in any suitable programming language, such as Java™, C, C #™ or C++, and/or any scripting language, such as Perl, Python, or TCL, as well as combinations of any programming and/or scripting languages. The application server(s) can also include database servers, including, without limitation, those commercially available from Oracle™, Microsoft™, Sybase™, IBM™, and the like, which can process requests from clients (including, depending on the configuration, dedicated database clients, API clients, web browsers, etc.) running on a user computer, user device, or customer device 705 and/or another server 715. In some embodiments, an application server can perform one or more of the processes for implementing media content streaming or playback, and, more particularly, to methods, systems, and apparatuses for implementing media stream synchronization, as described in detail above. Data provided by an application server may be formatted as one or more web pages (comprising HTML, JavaScript, etc., for example) and/or may be forwarded to a user computer 705 via a web server (as described above, for example). Similarly, a web server might receive web page requests and/or input data from a user computer 705 and/or forward the web page requests and/or input data to an application server. In some cases, a web server may be integrated with an application server.

In accordance with further embodiments, one or more servers 715 can function as a file server and/or can include one or more of the files (e.g., application code, data files, etc.) necessary to implement various disclosed methods, incorporated by an application running on a user computer 705 and/or another server 715. Alternatively, as those skilled in the art will appreciate, a file server can include all necessary files, allowing such an application to be invoked remotely by a user computer, user device, or customer device 705 and/or server 715.

It should be noted that the functions described with respect to various servers herein (e.g., application server, database server, web server, file server, etc.) can be performed by a single server and/or a plurality of specialized servers, depending on implementation-specific needs and parameters.

In certain embodiments, the system can include one or more databases 720a-720n (collectively, "databases 720"). The location of each of the databases 720 is discretionary:

merely by way of example, a database 720*a* might reside on a storage medium local to (and/or resident in) a server 715*a* (and/or a user computer, user device, or customer device 705). Alternatively, a database 720*n* can be remote from any or all of the computers 705, 715, so long as it can be in communication (e.g., via the network 710) with one or more of these. In a particular set of embodiments, a database 720 can reside in a storage-area network ("SAN") familiar to those skilled in the art. (Likewise, any necessary files for performing the functions attributed to the computers 705, 715 can be stored locally on the respective computer and/or remotely, as appropriate.) In one set of embodiments, the database 720 can be a relational database, such as an Oracle database, that is adapted to store, update, and retrieve data in response to SQL-formatted commands. The database might be controlled and/or maintained by a database server, as described above, for example.

According to some embodiments, system 700 might further comprise synchronization system 725 (which might correspond to synchronization systems or engines 105, 305, and 405, analyzer 350, timing pattern generator 355, and frame comparator 450 of FIGS. 1, 3, and 4, and/or the like), first device 730 (which might correspond to first devices 110, 310, and 410 of FIGS. 1, 3, and 4, and/or the like), frame buffer delay device 735 (which might correspond to frame buffer delay devices 130, 330, and 430 of FIGS. 1, 3, and 4, and/or the like), comparator 740 (optional) (which might correspond to comparator 375 and 475 of FIGS. 1, 3, and 4, and/or the like), video content source(s) 745 (which might correspond to video content sources 115, 315, and 415 of FIGS. 1, 3, and 4, and/or the like), database(s) 750 (which is associated with video content source(s) 745; and which might correspond to database(s) 120, 320, and 420 of FIGS. 1, 3, and 4, and/or the like), and/or the like.

In operation, the synchronization system 725 might receive a first signal that is output from the first device 730, wherein the first device receives an original video signal from a video source (e.g., video content source(s) 745 and/or database(s) 750, or the like) and outputs a first video signal. The synchronization system 725 might analyze the received first signal to determine a first frame buffer delay, and might generate a first delay adjustment signal based on the determined first frame buffer delay. The synchronization system 725 might send the first delay adjustment signal to a frame buffer delay device 735. The frame buffer delay device 735, which is separate from the first device 730, might receive the original video signal from the video source concurrent with the first device receiving the original video signal from the video source. The first delay adjustment signal would cause the frame buffer delay device 735 to apply the first frame buffer delay to the received original video signal to produce a second video signal that is synchronized with the first video signal. In some cases, the second video signal might be synchronized with the first video signal to within a predetermined threshold amount (which might be in terms of number of frames or number of seconds (or milliseconds), or the like).

In some embodiments, the synchronization system 725 might comprise a timing pattern generator and an analyzer. Non-limiting examples of such embodiments are shown in, and described below with respect to, FIGS. 3A-3F and 5B-5D. In these embodiments, the first signal would comprise a timing pattern.

In alternative embodiments, the synchronization system 725 might comprise a frame comparator. Non-limiting examples of these embodiments are shown in, and described below with respect to, FIGS. 4A-4C, 5E, and 5F. In these embodiments, the first signal would comprise the first video signal.

Merely by way of example, in some instances, comparator 740 might control the operation of the synchronization system 725, the first device 730, and/or the frame buffer delay device 735. Alternatively, or additionally, comparator 740 might perform additional processing of the video signals that are output by the first device 730 and/or the frame buffer delay device 735. In some cases, the comparator 740, which might be either remote relative to the synchronization system 725 (and accessible via network(s) 710) or local to the synchronization system 725, might perform frame-by-frame comparisons to detect video quality impairments (including, but not limited to, video encoding artifacts, noise, dropouts, etc.), and in some cases to further perform visual enhancement of video encoding artifacts or the like, as described in greater detail in the '145 application, which claims priority to '493 application (and which has already been incorporated herein by reference in its entirety for all purposes). Alternatively, or additionally, user device(s) or display device(s) 705 might display the first video signal that is output by the first device 730 and/or might display the second video signal that is output by the frame buffer delay device 735, which either allows a user to view the two video signals and to manual adjust the frame delay.

These and other functions of the system 700 (and its components) are described in greater detail above with respect to FIGS. 1-5.

While certain features and aspects have been described with respect to exemplary embodiments, one skilled in the art will recognize that numerous modifications are possible. For example, the methods and processes described herein may be implemented using hardware components, software components, and/or any combination thereof. Further, while various methods and processes described herein may be described with respect to particular structural and/or functional components for ease of description, methods provided by various embodiments are not limited to any particular structural and/or functional architecture but instead can be implemented on any suitable hardware, firmware and/or software configuration. Similarly, while certain functionality is ascribed to certain system components, unless the context dictates otherwise, this functionality can be distributed among various other system components in accordance with the several embodiments.

Moreover, while the procedures of the methods and processes described herein are described in a particular order for ease of description, unless the context dictates otherwise, various procedures may be reordered, added, and/or omitted in accordance with various embodiments. Moreover, the procedures described with respect to one method or process may be incorporated within other described methods or processes; likewise, system components described according to a particular structural architecture and/or with respect to one system may be organized in alternative structural architectures and/or incorporated within other described systems. Hence, while various embodiments are described with—or without—certain features for ease of description and to illustrate exemplary aspects of those embodiments, the various components and/or features described herein with respect to a particular embodiment can be substituted, added and/or subtracted from among other described embodiments, unless the context dictates otherwise. Consequently, although several exemplary embodiments are described above, it will be appreciated that the invention is intended to cover all modifications and equivalents within the scope of the following claims.

What is claimed is:

1. A method, comprising:
synchronizing, with a synchronization system, a first video signal with a second video signal that is output from a frame buffer delay device, by generating a first delay adjustment signal that causes the frame buffer delay device to apply a first frame buffer delay to an original video signal that is received by the frame buffer delay device to produce the second video signal.

2. The method of claim 1, wherein the synchronization system comprises a timing pattern generator and an analyzer, wherein the method further comprises:
switching, using a switch, input to a first device from the video source to the timing pattern generator, wherein the synchronization system receives the first video signal from the first device;
generating, with the timing pattern generator, a first timing pattern;
sending, with the timing pattern generator, the first timing pattern to the first device via the switch, wherein synchronizing the first video signal with the second video signal comprises:
receiving, with the analyzer, a second timing pattern that is output from the first device;
analyzing, with the analyzer, the second timing pattern to determine the first frame buffer delay; and
generating, with the analyzer, the first delay adjustment signal based on the determined first frame buffer delay; and
switching, using the switch, input from the timing pattern generator to the video source, wherein synchronizing the first video signal with the second video signal further comprises sending, with the analyzer, the first delay adjustment signal to the frame buffer delay device.

3. The method of claim 2, wherein the first timing pattern comprises a first anchor frame pattern of a plurality of anchor frame patterns, each of the plurality of anchor frame patterns being different from each other of the plurality of anchor frame patterns, wherein the first anchor frame pattern of the plurality of anchor frame patterns is encoded on a first frame of the original video signal and a second anchor frame pattern of the plurality of anchor frame patterns is encoded on a second frame of the original video signal, wherein the first frame and the second frame are separated by a predetermined number of frames of the original video signal, with intermediate frame patterns being encoded on intermediate frames of the original video signal between the first frame and the second frame, wherein each intermediate frame pattern is the same as the first anchor frame pattern, wherein analyzing the second timing pattern to determine the first frame buffer delay comprises:
initiating, with the analyzer, a counter when a first anchor frame of the plurality of anchor frame patterns is sent to the first device;
stopping, with the analyzer, the counter when the second timing pattern is received from the output of the first device;
analyzing, with the analyzer, the second timing pattern to identify a third anchor frame of the plurality of anchor frame patterns; and
determining, with the analyzer, the first frame buffer delay, based on a value of the counter when stopped, with respect to the third anchor frame.

4. The method of claim 3, wherein sending the first anchor frame to the first device comprises encoding the first anchor frame on a frame of the original video signal.

5. The method of claim 3, wherein the counter comprises a clock.

6. The method of claim 3, wherein each of the first anchor frame and the second anchor frame comprises timing information.

7. The method of claim 2, wherein the first timing pattern and the second timing pattern are the same pattern, wherein the first timing pattern and the second timing pattern are encoded on a first frame and a second frame, respectively, of the original video signal, wherein no timing patterns are encoded on each intermediate frame of a plurality of intermediate frames between the first frame and the second frame, wherein the plurality of intermediate frames between the first frame and the second frame comprises predetermined number of intermediate frames, wherein analyzing the second timing pattern to determine the first frame buffer delay comprises:
initiating, with the analyzer, a counter when the first timing pattern is sent to the first device;
stopping, with the analyzer, the counter when the second timing pattern is received from the output of the first device; and
determining, with the analyzer, the first frame buffer delay, based on a value of the counter when stopped and based on the predetermined number of intermediate frames between the first frame and the second frame.

8. The method of claim 7, wherein sending the first timing pattern to the first device via the switch comprises encoding, with the timing pattern generator, the first timing pattern on the first frame of the original video signal.

9. The method of claim 2, wherein the timing pattern generator and the analyzer are part of an integrated timing pattern generator-analyzer system.

10. The method of claim 1, wherein the synchronization system comprises a frame comparator, wherein the method further comprises:
receiving, with the frame comparator, the second video signal that is produced by the frame buffer delay device, wherein synchronizing the first video signal with the second video signal comprises:
receiving, with the frame comparator, the first video signal that is output from a first device, wherein the synchronization system receives the first video signal from the first device;
analyzing, with the frame comparator, the received first video signal and the received second video signal to determine a second frame buffer delay;
generating, with the frame comparator, a second delay adjustment signal based on the determined second frame buffer delay; and
sending, with the frame comparator, the second delay adjustment signal to the frame buffer delay device to produce the second video signal;
determining, with the frame comparator, whether the first video signal and the second video signal match to within a predetermined minimal difference; and
based on a determination that a difference between the received first video signal and the received second video signal exceeds the predetermined minimal difference, repeating the processes of:
generating, with the frame comparator, the second delay adjustment signal based on the second frame buffer delay;

sending, with the frame comparator, the second delay adjustment signal to the frame buffer delay device, the second delay adjustment signal causing the frame buffer delay device to apply the second frame buffer delay to the received original video signal to produce the second video signal;

receiving, with the frame comparator, the first video signal;

receiving, with the frame comparator, the second video signal;

analyzing, with the frame comparator, the received first video signal and the received second video signal; and determining, with the frame comparator, whether the received first video signal and the received second video signal match to within the predetermined minimal difference.

11. The method of claim 10, wherein determining whether the first video signal and the second video signal match to within the predetermined minimal difference comprises:

computing, with the frame comparator, a difference signal between the first video signal and the second video signal; and analyzing, with the frame comparator, the difference signal with respect to the predetermined minimal difference.

12. The method of claim 10, wherein determining whether the first video signal and the second video signal match to within the predetermined minimal difference comprises utilizing one of peak signal-to-noise ratio ("PSNR") technique or root mean square ("RMS") technique.

13. The method of claim 1, wherein the second video signal is synchronized with the first video signal to within a predetermined threshold amount.

14. The method of claim 1, further comprising:

comparing, with a computing system, the first video signal and the second video signal in real-time, on a frame-by-frame basis.

15. The method of claim 1, wherein the synchronization system receives the first video signal from a first device, wherein the first device comprises one of a video encoder, a video decoder, a video encoder/decoder system, a video transcoder, a video storage and replay system, a video transport system, or a video broadcast system.

16. A synchronization system, comprising:

at least one processor; and a non-transitory computer readable medium communicatively coupled to the at least one processor, the non-transitory computer readable medium having stored thereon computer software comprising a set of instructions that, when executed by the at least one processor, causes the synchronization system to:

synchronize a first video signal with a second video signal that is output from a frame buffer delay device, by generating a first delay adjustment signal that causes the frame buffer delay device to apply a first frame buffer delay to an original video signal that is received by the frame buffer delay device to produce the second video signal.

17. The synchronization system of claim 16, further comprising a timing pattern generator, an analyzer, and a switch, wherein the first signal comprises a second timing pattern, wherein the set of instructions, when executed by the at least one processor, further causes the synchronization system to:

switch, using the switch, input to a first device from the video source to the timing pattern generator, wherein the synchronization system receives the first video signal from the first device;

generate, with the timing pattern generator, a first timing pattern;

send the first timing pattern to the first device via the switch, wherein synchronizing the first video signal with the second video signal comprises:

receiving, with the analyzer, the second timing pattern that is output from the first device;

analyzing, with the analyzer, the second timing pattern to determine the first frame buffer delay; and generating, with the analyzer, the first delay adjustment signal based on the determined first frame buffer delay; and switch, using the switch, input from the timing pattern generator to the video source, wherein synchronizing the first video signal with the second video signal comprises sending, with the analyzer, the first delay adjustment signal to the frame buffer delay device.

18. The synchronization system of claim 16, further comprising a frame comparator, wherein the set of instructions, when executed by the at least one processor, further causes the synchronization system to:

receive, with the frame comparator, the second video signal that is produced by the frame buffer delay device, wherein synchronizing the first video signal with the second video signal comprises:

receiving, with the frame comparator, the first video signal that is output from a first device, wherein the synchronization system receives the first video signal from the first device;

analyzing, with the frame comparator, the received first video signal and the received second video signal to determine a second frame buffer delay;

generating, with the frame comparator, a second delay adjustment signal based on the determined second frame buffer delay; and sending, with the frame comparator, the second delay adjustment signal to the frame buffer delay device to produce the second video signal;

determine, with the frame comparator, whether the first video signal and the second video signal match to within a predetermined minimal difference; and based on a determination that a difference between the received first video signal and the received second video signal exceeds the predetermined minimal difference, causing the synchronization system to repeat:

generating, with the frame comparator, the second delay adjustment signal based on the second frame buffer delay;

sending, with the frame comparator, the second delay adjustment signal to the frame buffer delay device, the second delay adjustment signal causing the frame buffer delay device to apply the second frame buffer delay to the received original video signal to produce the second video signal;

receiving, with the frame comparator, the first video signal;

receiving, with the frame comparator, the second video signal;

analyzing, with the frame comparator, the received first video signal and the received second video signal; and determining, with the frame comparator, whether the received first video signal and the received second video signal match to within the predetermined minimal difference.

19. The synchronization system of claim 16, wherein the second video signal is synchronized with the first video signal to within a predetermined threshold amount.

20. The synchronization system of claim 16, claim 1, wherein the synchronization system receives the first video signal from a first device, wherein the first device comprises one of a video encoder, a video decoder, a video encoder/decoder system, a video transcoder, a video storage and replay system, a video transport system, or a video broadcast system.

* * * * *